(12) United States Patent
Morichika et al.

(10) Patent No.: US 8,761,972 B2
(45) Date of Patent: Jun. 24, 2014

(54) TRACK TYPE TRANSPORTATION SYSTEM

(75) Inventors: Shunji Morichika, Hiroshima-ken (JP); Katsuaki Morita, Hiroshima-ken (JP); Masahiro Yamaguchi, Hiroshima-ken (JP); Mitsuaki Hoshi, Hiroshima-ken (JP); Kousuke Katahira, Hiroshima-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 437 days.

(21) Appl. No.: 12/515,149

(22) PCT Filed: Jan. 21, 2008

(86) PCT No.: PCT/JP2008/051135
§ 371 (c)(1),
(2), (4) Date: May 15, 2009

(87) PCT Pub. No.: WO2009/011141
PCT Pub. Date: Jan. 22, 2009

(65) Prior Publication Data
US 2010/0036553 A1 Feb. 11, 2010

(30) Foreign Application Priority Data
Jul. 19, 2007 (JP) .................................. 2007-188678

(51) Int. Cl.
*B61F 9/00* (2006.01)

(52) U.S. Cl.
CPC .. *B61F 9/005* (2013.01); *B61F 9/00* (2013.01)
USPC ................. 701/19; 701/23; 104/96; 104/106; 104/110

(58) Field of Classification Search
CPC .................................. B61F 9/00; B61F 9/005
USPC .............. 701/19, 23; 198/465.4; 104/96, 106, 104/101
See application file for complete search history.

(56) References Cited

U.S. PATENT DOCUMENTS 5,764,014 A * 6/1998 Jakeway et al. ............... 318/587
5,844,682 A 12/1998 Kiyomoto et al.
(Continued)

FOREIGN PATENT DOCUMENTS

| CN | 1624241 A | 6/2005 |
| DE | 19918071 C1 | 7/2000 |

(Continued)

OTHER PUBLICATIONS

ISR for PCT/JP2008/051135 dated May 1, 2008.
(Continued)

*Primary Examiner* — John Q Nguyen
*Assistant Examiner* — Michael Whalen
(74) *Attorney, Agent, or Firm* — Kanesaka Berner & Partners, LLP

(57) ABSTRACT

In a track type protection system comprising an automatic steering mechanism and a fail-safe mechanism, provided is a detection mechanism which can detect a deviated value of a vehicle, widthwise of a track, and which is highly reliable. The track type transportation system in which the vehicle runs on the road surface of the track, comprising the steering mechanism for automatically steering the front and rear wheels of the vehicle by means of actuators, and the fail-safe mechanism composed of a protection track defined on the road surface of the track, and protection wheels provided in the lower part of the vehicle and adapted to run in the protection track without making contact with the protection track, wherein there are provided a pair of noncontact type displacement meters 13 which are attached to a support bracket 64 suspended downward from the lower part of the vehicle body, and which are arranged in the protection track 14 so as to irradiate detection waves a onto the left and right side walls 14a of the protection track, thereby the distances from the noncontact type displacement meters 13 to the left and right side walls of the protection track are measured by the pair of noncontact type displacement meters.

6 Claims, 23 Drawing Sheets

Section along line Q - Q

(56) References Cited

U.S. PATENT DOCUMENTS

| | | | | |
|---|---|---|---|---|
| 6,129,025 | A | * | 10/2000 | Minakami et al. ......... 104/88.01 |
| 7,403,296 | B2 | * | 7/2008 | Farritor et al. ................ 356/614 |
| 2003/0235331 | A1 | | 12/2003 | Kawaike et al. |
| 2006/0144129 | A1 | * | 7/2006 | Farritor et al. .................... 73/81 |
| 2006/0200280 | A1 | | 9/2006 | Kono et al. |

FOREIGN PATENT DOCUMENTS

| | | | | | |
|---|---|---|---|---|---|
| JP | 58022750 | A | | 2/1983 | |
| JP | 06-042927 | A | | 2/1994 | |
| JP | 6289931 | A | | 10/1994 | |
| JP | 7104066 | A1 | | 4/1995 | |
| JP | 7311312 | A1 | | 11/1995 | |
| JP | 11-506825 | A1 | | 6/1999 | |
| JP | 11506825 | A1 | | 6/1999 | |
| JP | 2000214260 | A1 | | 8/2000 | |
| JP | 2000264196 | A | | 9/2000 | |
| JP | 2000-357839 | A1 | | 12/2000 | |
| JP | 2000357839 | A | | 12/2000 | |
| JP | 2001074880 | A | * | 3/2001 | ............. G21C 21/02 |
| JP | 2002019603 | A | | 1/2002 | |
| JP | 2002108452 | A1 | | 4/2002 | |
| JP | 2002255026 | A1 | | 9/2002 | |
| JP | 2003269915 | A1 | | 9/2003 | |
| JP | 2005180943 | A1 | | 7/2005 | |
| JP | 2006175962 | A | | 7/2006 | |
| JP | 2006306334 | A | | 11/2006 | |
| WO | 96/39612 | A1 | | 12/1996 | |
| WO | 97/02167 | A1 | | 1/1997 | |
| WO | 2004040391 | A1 | | 5/2004 | |

OTHER PUBLICATIONS

SIPO Office Action for CN Application 200880001593.6, issued Mar. 23, 2011.
Search Report and Substantive Examination Report of Singapore Patent Application No. 200905683-9, dated Oct. 18, 2010.
Korean Office Action for 2009-7010918 mailed Oct. 1, 2011.
Japanese Office Action for 2009-523553 mailed Aug. 19, 2011.
Korean Office Action mailed Aug. 1, 2012 for KR10-2009-7010918.
Notification of Reason for Refusal for JP2009-523553 dated Apr. 27, 2012.
IPRP for PCT/JP2008/051135 dated Jan. 28, 2010.
Japanese Notice of Allowance effective Apr. 8, 2013 as issued in corresponding Japanese application No. 2009-523553, with English translation.
Korean Notice of Allowance effective Nov. 1, 2012 as issued to the corresponding Korean application No. 2009-7010918, with English translation.

* cited by examiner

Section along line A - A

Section along line C - C

Section along line E - E

Section along line D - D

Section along line G - G

Section along line F - F

Section along line I - I

Section along line H - H

Section along line J - J

Section along line L - L

Section along line O - O

Section along line N - N

Section along line Q - Q

Section along line P - P

TRACK TYPE TRANSPORTATION SYSTEM

RELATED APPLICATIONS

The present application is based on International Application Number PCT/JP2008/051135 filed Jan. 21, 2008, and claims priority from Japanese Application Number 2007-188678 filed Jul. 19, 2007, the disclosures of which are hereby incorporated by reference herein in their entirety.

BACKGROUND OF THE INVENTION

1. Technical Field

The present invention relates to a track type transportation system for a vehicle which runs on a predetermined track, and in particular to a track type transportation system in which the front and rear wheels of a vehicle are automatically steered by actuators, and which incorporates therein a fail-safe mechanism for preventing the vehicle from coming off from a track upon malfunctioning of an automatic steering mechanism.

2. Background Art

The applicant has already proposed a track type transportation system for a vehicle, incorporating a steering mechanism for automatically steering the front and rear wheels of the vehicle by means of actuators so as to allow the vehicle to run on a predetermined track, and a fail-safe mechanism for preventing the vehicle from coming off the track even though the automatic steering mechanism is malfunctioning (refer to Patent Document: Japanese Patent Laid-Open No. 2006-306334). Explanation will be hereinbelow made of the track type transportation system disclosed in the Patent Document 1.

Referring to FIGS. 24 and 25, a vehicle 012 in a track type transportation system 010, runs along a track 01 incorporating a U-like sectional shape protection track 014 laid substantially on its center line and formed in a channel-like configuration with respect to a road surface 015. The U-like sectional shape protection track 014 is formed of a U-like channel steel laid on the road surface.

The vehicle 012 is provided with a front wheel bogie 016 and a rear wheel bogie (which is not shown) for supporting the vehicle 012, underneath the vehicle 012 in a front and a rear part thereof. The front wheel bogie 016 is mounted thereto with an axle for front wheels 018 so as to be pivotable left and right. The front wheels 018 are mounted thereon with a core type rubber tire 020 which is although not shown. Further, the rear wheel bogie is also mounted thereto with an axle for rear wheels 022 so as to be pivotable left and right. The rear wheels 022 are also mounted thereon with rubber tires 020 which is although not shown.

Next, explanation will be made of a steering mechanism, focusing on the front wheel 018 side. It is noted that the rear wheel 018 side has also a configuration similar to that of the front wheel side.

As shown in FIGS. 24 and 25, there are provided a front steering arm 028a connected to the front left wheel 018b and extending forward, and a rear steering arm 030a extending rearward. The front right wheel 018a is provided thereto with a rear steering arm 30b extending rearward. The steering arms 030a, 030b of the front left and right wheels are mounted with a tie rod spanning between their lower end parts. These rear steering arms 030a, 030b are rotatably coupled to the tie rod 032 by means of spherical joints 034.

Further, the front end part of the front steering arm 028a is coupled rotatably thereto with a distal end part of a movable rod 038 of an actuator 036 by means of a spherical joint 034. The actuator 036 is attached to the front wheel bogie 016. As to a specific structure of the actuator 036, there is used a ball-screw structure with a motor as will be described later. However, any means capable of carrying out translational motion, such as a pneumatic or hydraulic cylinder, a linear motor or the like may be used.

It is noted that the tie rod 032 and the rear steering arms 030a, 030b constitute the so-called Ackerman-Jeantaud type link mechanism for appropriately controlling the steering angles of the left and right wheels upon turning. Further, the left wheels 18b and the right wheels 18a are linked together by the tie rod 032, and accordingly, the left and right wheels can surely be steered.

Next, explanation will be made of protection wheels 040. The protection wheels 040 are cylindrical, and are rotatably supported respectively to the front and rear end parts of a protection arm 042 on the rear surface side. Further, the protection wheels 040 are inserted in the U-like protection track 014 so that their peripheral surfaces are faced to the side walls of the protection track 014. The protection wheels are made of a material which is desirably, highly vibration-resistant and wear-resistant urethane rubber, a material utilizing a steel belt as used in a rubber type or the like.

Further, the protections wheels 040 and the side walls of the protection track 014 define therebetween gaps which are less than an allowable range the vehicle 012 should not turn further more left and right, and the protection wheels do not make contact with the sidewalls of the protection track 014 whenever the steering mechanism is normally operated. Normally, the gaps between the protection wheels and the protection track 014 are set in a range from about to 80 to 100 mm.

The protection arm 042 has a shape which is elongated in the longitudinal direction of the vehicle, and is rotatably supported in its center part to the lower part of the axle 044 of the front wheel 018.

It is noted that the height of the protection wheels 040 may be set so that they are arranged above the road surface 015 as shown in FIG. 25(a) or below the road surface 015 as shown in FIG. 25(b). Thus, any suitable structure may be selected so as to be adaptable for an existing track in view of its replace specification, that is, the adaptation is more flexible.

The protection arm 042 is coupled in the vicinity of the one end part thereof to the front end part of the front steering arm 042 through the intermediary of a link rod 046, and accordingly, the link rod 046 and the protection arm 042 cause the protection wheels 040 to be directed in the same direction as the steering direction of the front wheels 018.

The steering mechanism is composed of the actuator 036, the movable rod 038, the front steering arm 028a, the rear steering arms 030a, 030b, and the link mechanism is composed of the protection arm 042 and the link rod 046.

Further, the steering arm 028a is provided in its front end part with a double surface joint 050 with which one end part of the movable rod 038 of the actuator 036 and one end part of the link rod 046 are coupled to the front end part of the front steering arm 028a, being overlapped one upon another. With the use of the above-mentioned double spherical joint 050, it is possible to aim at effectively use a space.

The structure for mounting the steering mechanism, the protection arm 042 and the actuator 036 onto the front wheel bogie 016 will be explained with reference to FIGS. 26 and 27.

There is provided an axle housing 060 in which a differential mechanism portion 056 inputted thereto with a drive power from a drive motor (which is not shown), is integrally incorporated with an axle portion 058 for transmitting a drive power to the left and the right wheels, and a bogie frame 062 is provided above the axle housing 062.

The protection arm 042 is attached thereto with a support bracket 064 supported to the lower part of the differential mechanism portion 056, the rotating center thereof being located at the center of the axle. The support bracket 064 is attached in its upper part to the bogie frame 062, being extended downward around the differential mechanism portion 056, and has, in its lower part, a protection frame 066 for rotatably holding the protection arm 042. The protection frame 066 has a center support structure, for a pivotal fulcrum of the protection arm 042, in which the pivotal fulcrum is vertically interposed. Further, the protection frame 066 is formed with left and right vertical walls 068*a*, 068*b* which are capable of limiting the pivotable range of the protection arm 042.

As shown in FIG. 27, the actuator has such a unit structure that an electric motor 072, a clutch 074, a ball screw 076 and a limit guide 078 are assembled to the lower surface part of an L-like sectional shape frame 070. The frame 070 having such a unit structure that the above-mentioned components are assembled thereto is fastened to the bogie 062 by means of bolts. The ball screw 076 has a feed nut part 080 which is joined thereto with one end part of the movable rod 038 of the actuator 036, and the other end part of the movable rod 038 is joined to the upper spherical surface part 052 of the double spherical joint 50 so as to be coupled with the front steering arm 028*a*.

Further, as shown in FIG. 26, one end part of the protection arm 042 and the lower spherical joint part 054 of the double spherical joint 050 are connected therebetween by means of the link rod 46, and are then coupled to the front steering arm 028*a*. The rear steering arm 030*a* is jointed in its rear end part with the tie rod 032, and is coupled to the rear steering arm 030*b* for the right wheel.

With the above-mentioned mounting structure in which the protection arm 040 mounted thereto with the protection wheels 040 is supported to the lower part of the differential mechanism portion 056 of the highly rigid axle housing 060 so as to use the support bracket 064 attached to the bogie frame 062 in order to eliminate the necessity of the modification of the bogie for attaching the protection arm 042, the existing bogie frame 062 for the front wheels can be used as it is. Thereby it is possible to aim at commonly using the components of the bogie frame 062 and at reducing the manufacturing costs. Further, since the unit structure of the actuator is mounted on the bogie frame 062, the efficiencies of the assembly work, the component replacement work and the maintenance service can be enhanced. Due to the unit structure, the configuration can be simplified, thereby it is possible to aim at allowing the apparatus to be lightweight.

Further, the actuator 036 is normally operated in response to a steering instruction from a control means which is not shown, so as to apply a steering force to the front left wheel 048*b* by the actuator 036, and then, the steering force is transmitted from the front steering arm 028 to the rear steering arm 030*a*, and is then transmitted therefrom to the front right wheel 018*a* through the intermediary of the tie rod 032. Further, the steering force from the actuator 036 is also transmitted from the double spherical joint 050 to the protection arm 042 through the intermediary of the link rod 046, and accordingly, the protection wheels 40 are also moved in association with the motion of the actuator 036 so as to be directed in the same direction as that of the front wheels 018. Thus, the protection wheels 040 are moved in the protection track 014 together with the wheel 012 without making contact with the side walls of the protection track 014.

Upon malfunctioning of the above-mentioned steering mechanism, the protection wheels 040 make contact with the left and right walls of the protection track 014, and accordingly, it is possible to prevent the vehicle from running away from the track.

In the steering system disclosed in the Patent Document 1, whether the vehicle follows up a desired locus or not is determined, and the front wheels and the rear wheels of the vehicle are automatically steered by the actuators so as to guide the vehicle. However, it is necessary to measure a deviated value widthwise of the track with respect to the advancing direction of the vehicle in order to precisely determine whether the vehicle follows up a desired running locus (which is precisely a line connecting the centers of the respective axles of the front and rear wheel bogies of the vehicle).

In order to measure the deviated value of the vehicle, widthwise of the track, there is required an on-ground structure serving as a reference position for the measurement. Further, a noncontact type measuring instrument which has a high degree of measuring accuracy, and which does not cause any wearing problem is preferably used as a measuring device therefor, and such a noncontact type measuring instrument would cause a risk with respect to its environmental resistance in view of rain water, sunlight or the like. Thus, there would be possibly caused a trouble throughout the entire system upon occurrence of a detection error.

DISCLOSURE OF THE INVENTION

The present invention is devised in view of the above-mentioned problems inherent to the above-mentioned conventional technology, and accordingly, an object of the present invention is to provide a detection mechanism which is capable of precisely detecting a deviated value of a vehicle widthwise of a track and which is highly reliable, in a track type transportation system incorporating an automatic steering mechanism and a fail-safe mechanism as stated above.

Further, as to another object of the present invention, in addition to a noncontact type displacement meter, there is also provided a contact type displacement meter which is adapted to make contact with a protection track only when the noncontact type displacement meter is malfunctioning, thereby it is possible to provide a highly reliable detection mechanism.

To the end, according to the first aspect of the present invention, there is provided a track type transportation system in which a vehicle runs on a predetermined track, comprising a steering unit for automatically steering front and rear wheels of the vehicle by means of actuators, a fail-safe mechanism composed of a protection track defined in a road surface of the track, and protection wheels provided in the lower part of the vehicle and running in the protection track without making contact therewith, the track type transportation system including a pair of noncontact type displacement meters which are attached to a support bracket suspended downward form a lower part of a vehicle body, which are located in the protection track, and which emit detection waves toward respectively to left and right side walls of the protection track so as to measure distances from the mounted positions of the pair of noncontact type displacement meters to the left and right walls of the protection track.

In a more specific form, in order to achieve the above-mentioned objects, the track type transportation system according to the first aspect of the present invention in which a vehicle runs on a predetermined track having a load surface, incorporating a steering mechanism for automatically steering front and rear wheels of the vehicle by means of actuators, and a fail-safe mechanism composed of a protection track defined in the road surface of the track and protection wheels attached to the lower part of the vehicle and are moved in the protection track without making contact with the protection track, is characterized in that there are provided a pair of noncontact type displacement meters which are attached to a support bracket suspended downward from a lower part of a vehicle body, which are located in the protection track, and which emit detection waves respectively toward left and right side walls of the protection track so as to measure distances from the mounted positions of the noncontact type displacement meters to the left and right sides walls of the protection track, that is, the track type transportation system in which a vehicle runs on a predetermined track having a road surface, more preferably incorporating a steering mechanism for steering front and rear wheels of the vehicle by means of actuators, and a fail-safe mechanism composed of a protection track defined between a pair of left and right side walls extending in parallel with a running direction of the vehicle, and protection wheels which are moved in the protection track defined between the side walls without making contact with the protection track, is characterized in that there are provided a pair of noncontact type displacement meters which are attached to a support bracket suspended downward from a lower part of a vehicle body, a detection wave (emission wave) from the first one of the displacement meters is directed toward one of the side walls, a detection wave from the other one of the displacement meters is directed toward the other one of the side walls, the pair of noncontact type displacement meters are located in the space of the protection track defined between the left and right side walls, the pair of noncontact type displacement meters receive reflection waves from the side walls so as to measure distances from the respective mounted positions of the noncontact type displacement meters to the left and side walls so as to detect left and right deviated values of the vehicle, widthwise of the track.

In the first aspect of the present invention, the protection track which constitutes the fail-safe mechanism is used as a reference structure for the measurement, and the pair of noncontact displacement meters are suspended from the lower part of the vehicle body and are located in the protection track. Further, detection waves are emitted from the pair of noncontact type displacement meters toward the left and right side walls of the protection track, respectively, in order to measures distances to the left and right side walls. Thus, since the distances from the noncontact type displacement meters to the left and right side walls are measured, a deviated value of the vehicle with respect to the track can be detected.

In the first aspect of the present invention, in the case of emitting the detection wave from the noncontact type displacement meter onto the object to be measured, should the noncontact type displacement be spaced from the object to be measured by a distance less than a predetermined distance, no precise distance could be measured. In this case, the noncontact type displacement meters are arranged so as to emit detection waves in directions oblique to the left and right side walls of the protection walls, and accordingly, the distances which are required for the measurements can be maintained.

In a more specific form, in order to obtain sufficient optical path lengths from the respective mounted positions of the noncontact type displacement meters to the left and right side walls of the protection track, for example, the pair of noncontact type displacement meters are arranged in the direction orthogonal to the extending direction of the pair of left and right walls of the protection track and the direction of emission of the detection waves are set to be oblique, or alternatively, the centers of the mounting places of the displacement meters are located being biased toward the side walls which are opposite to the directions of emission of the detection waves so as to ensure required distances for the measurement.

In the first aspect of the present invention, since the protection track is used as a reference structure for the measurement while the measuring devices are provided in the lower part of the vehicle, no large scale modification is required for the vehicle body, thereby it is possible to reduce the modification costs. Further, since the noncontact type displacement meters are used, they are excellent in wear-resistance, and a high degree of detection accuracy and a high responsiveness can be obtained.

It is noted that a shield cover for the noncontact type displacement meters is provided in order to prevent reflection light from disturbance light reflected at the side walls of the protection track, from being overlapped with laser beams emitted by the noncontact type displacement meters. Further, with the provision of the cover, the environmental resistance of the noncontact type displacement meters with respect to rain water or sunlight can be enhanced.

In a more specific form, the shield cover is provided surrounding the pair of noncontact type displacement meters, except the parts corresponding to the detection waves inlets and outlet paths of the noncontact type displacement meters, and the cover is preferably formed of a photoabsorption member coated thereover with a black body or a dark color body so as to prevent reflection light from disturbance light reflected upon the side walls of the track from being overlapped with laser beams emitted from the noncontact type displacement meters. In particular, in the space below the vehicle, several sparks are caused by rails ways, steel wheels and the like which make contact with one another, as well brakes, motors and the like. Further, with the provision of the cover formed of a photoabsorbing member coated thereover with a black body or a dark color body, it is possible to enhance the environmental resistance with respect to rain water and sunlight.

Further, according to a second aspect of the present invention, there is provided a track type transportation system in which a vehicle runs on a predetermined track, comprising a steering unit for automatically steering front and rear wheels of the vehicle by means of actuators, a fail-safe mechanism composed of a protection track defined in a road surface of the track, and protection wheels provided in the lower part of the vehicle and running in the protection track without making contact therewith, the track type transportation system including a pair of noncontact type displacement meters which are attached to a support bracket suspended downward form a lower part of a vehicle body, which are located in the protection track, and which emit detection waves respectively in the vehicle running directions of the protection track, reflectors for reflecting the detection waves emitted from the pair of noncontact type displacement meters onto the left and right walls of the track, so as to measure distances from the mounted positions of the pair of noncontact type displacement meters to the left and right walls of the track by the means of the pair of noncontact type displacement meters.

In the more specific form of the second aspect of the present invention, a track type transportation system in which a vehicle runs on a predetermined track, comprising a steering unit for automatically steering front and rear wheels of the vehicle by means of actuators, and a fail-safe mechanism composed of a protection track defined in a road surface of the track, and protection wheels provided in the lower part of the vehicle and running in the protection track without making contact therewith, is characterized in that there are provided a pair of noncontact type displacement meters which are attached to a support bracket suspended downward form a lower part of a vehicle body, which are located in the protection track, and which emit detection waves respectively in the vehicle running directions of the protection track, reflectors for reflecting the detection waves emitted from the pair of noncontact type displacement meters onto the left and right walls of the protection track, so as to measure distances from the mounted positions of the pair of noncontact type displacement meters to the left and right walls of the protection track by the means of the pair of noncontact type displacement meters, that is, more preferably, reflection surfaces are arranged on optical paths on which the detection waves are emitted from the pair of noncontact type displacement meters respectively toward the side walls, so as to obtain sufficient optical path lengths from the mounted positions of the pair of noncontact type displacement meters to the side walls of the protection walls in order to measure distances from the mounted positions of the pair of noncontact type displacement meters to the left and right side walls of the protection track.

In the second aspect of the present invention in which the reflectors are provided for reflecting the detection waves emitted from the noncontact type displacement meters onto the left and right side walls of the protection track, the directions of the arrangement of the noncontact type displacement meters may have a relative flexibility, thereby it is possible to facilitate the arrangement of the noncontact type displacement meters in a narrow space within the protection track.

According to the present invention, there may be, for example, used a laser beam irradiation type or an ultrasonic wave irradiation type displacement meter as the noncontact type displacement meter.

Further, in the first and second aspects of the present invention, there may be preferably provided a contact type displacement meter comprising a pair of contact members attached to the lower part of the vehicle in the vicinity of the above-mentioned noncontact type displacement meters so as to be movable leftward and right ward, widthwise of the protection track, means for urging resilient forces respectively to the contact members so as cause the contact element to always press the left and right side walls of the protection track, means for detecting positions of the contact element making contact with the left and right side walls of the protection track, and a means for holding the pair of contact members at stand-by positions which are spaced respectively from the left and right side walls of the protection track.

In a more specific form, there are provided a contact type displacement meter comprising a pair of contact members mounted to the lower part of the vehicle in the vicinity of the noncontact type displacement meters so as to be movable leftward and rightward, widthwise of the protection track, and shifting means for shifting the contact members up to positions at which the contact members be pressed against the left and right side walls of the protection track through the intermediary of resilient force urging means, means for detecting positions of the contact members making respectively contact with the left and right walls of the protection track, and stand-by means for holding the pair of contact members at stand-by positions at which the contact members are separated away respectively from the left and right side walls of the protection track, and determining means preferably provided, for determining whether the above-mentioned noncontact type displacement meters are malfunctioning or not, wherein when the noncontact type displacement meters are normally operated, the contact members are held at the stand-by positions at which the contact members are separated away from the left and right side walls of the protection track by the stand-by means, but when the malfunctioning is determined, the pair of contact members are shifted from the stand-by positions to the positions at which the contact members are pressed against the associated left and right side walls of the protection track by the shifting means, and are positioned at the pressing positions on the left and right side walls of the protection track through the intermediary of the resilient force urging means so as to detect left and right deviated values of the vehicle through the intermediary of the contact members with respect to the protection track.

With the provision of the above-mentioned contact type displacement meter having the above-mentioned configuration, when the noncontact type displacement meters are normally operated, the contact members of the contact type displacement meter are held at the stand-by positions separated away from the left and right side walls of protection track. In the case of inferior measurement by the noncontact type displacement meters, the contact type displacement meter can be used as auxiliary means, instead thereof. Thus, when the measurement of the noncontact type displacement meters which are apprehensive as to the environmental resistance becomes inferior, the contact type displacement meter is used in order to make up for the demerit of the noncontact type displacement meters so as to enhance the reliability.

The contact type displacement meter is arranged in the vicinity of the noncontact type displacement meters so as to set the measuring positions of both noncontact type and contact type displacement meters as near as possible in order to enhance the degree of measuring accuracy.

Further, since the contact members are pressed against the left and right side wall of the protection track by the resilient force urging means, it is possible to surely make the contact members into contact with the side walls. In a more specific form, in this case, the shifting means is configured so as to allow the pair of contact members to symmetrically shift, and accordingly, the resilient forces of the resilient force urging means at the pressing positions on the left and right walls of the protection track are preferably balanced to each other.

For example, rollers may be used as the pair of contact type displacement meters, and there are provided arms each of which is attached at its one end part to the lower part of the vehicle in the vicinity of the associated noncontact type displacement meter so as to be pivotable leftward and rightward, widthwise of the protection track, and the associated roller is preferably attached to the other end part of the arm.

With this configuration, a high rigidity may be given to the roller supporting mechanism.

As another configuration of the contact type displacement meter, there may be provided such a configuration that the pair of contact members are rollers, and there are provided electric motor driven cylinders having piston rods which are extendable leftward and rightward, widthwise of the protection track, and link mechanisms each attached to the piston rod of the associated electric motor cylinder and constituting a parallelogram, the roller being attached to the link mechanism. With this configuration, the roller support structure may have a high rigidity.

Further, as another configuration of the contact type displacement meter, roller are used as the contact members, and there may be provided a plurality of slide rods which are arranged in parallel in the lower part of the vehicle in the vicinity of the noncontact type displacement meters, widthwise of the protection track, and slide guides slidably supporting the slide rods, the rollers being attached to the forward end parts of the slide rods.

In a more specific form, as another configuration of the contact type displacement meter, rollers are used as the pair of contact members, there are provided a plurality of slide rods which are mounted to the lower part of the vehicle in the vicinity of the noncontact type displacement meters, and which are laid in a direction orthogonal to the extending direction of the protection track composed of the left and right side walls (that is, the direction in which the contact members go to and away from the side walls of the protection track), and a slide guide for slidably supporting the slide rods (in the direction in which the contact members go to and away from the side walls of the protection track), the above-mentioned rollers being attached to the front ends of the slide rods.

With this configuration, the structure of the contract type displacement meter can be simplified.

Further, as another configuration of the contact type displacement meter, rollers are used as the pair of contact members, and there is provided a link mechanism which is mounted in the lower part of the vehicle in the vicinity of the noncontact type displacement meters, and which is expandable and shrinkable leftward and rightward, widthwise of the protection track, the above-mentioned rollers being attached to the distal end parts of the link mechanism.

In a more specific form, rollers are used as the pair of contact members, and there is provided a link mechanism which is mounted to the lower part of the vehicle in the vicinity of the noncontact type displacement meters and which are expandable and shrinkable in a direction in which the contact members go to and away from the side walls of the protection track, the above-mentioned rollers being attached to distal end parts of the link mechanism.

According to the first aspect of the present invention, a pair of noncontact type displacement meters are mounted to a support bracket suspended downward from the lower part of a vehicle body and located in the protection track, for emitting detection waves toward the left and right walls of the protection track, respectively, so that distances from the mounted positions of the noncontact displacement meters to the left and side walls of the protection track are measured by the pair of noncontact type displacement meters, thereby it is possible to detect a deviated value of the vehicle widthwise of the track at low costs without the necessity of the provision of a large scale structure in the vehicle body. Further, with the use of the noncontact type displacement meters, the detection apparatus may have a high wear resistance and a high degree of accuracy.

Further, according to the second aspect of the present invention, there are provided a pair of noncontact type displacement meters attached to a support bracket suspended downward from the lower part of a vehicle body and located in the protection track, for emitting detection waves in directions in which the vehicle runs on the protection track, respectively, and reflectors for reflecting the detection waves emitted from the pair of the noncontact type displacement meters, toward the left and right side wall of the protection track, wherein distances from the mounted positions of the noncontact type displacement meters to the left and right side walls of the protection track are measured by the pair of noncontact type displacement meters, and accordingly, the degrees of freedom of the arrangement of the noncontact type displacement meters can be further increased, in addition to the above-mentioned technical effects and advantages. Thus, the configuration of the apparatus can be further simplified, and the distance between the noncontact type displacement meter and an object to be measured can be set to be sufficient, thereby it is possible to enhance the high degree of accuracy.

BRIEF DESCRIPTION OF THE INVENTION

BEST MODES OF THE INVENTION

Explanation will be detailed in the form of embodiments shown in the accompanying drawings. Components described in these embodiments should not be intended to limit the present invention thereto in view of their dimensions, materials, shapes and relative arrangements thereof unless otherwise specified.

Embodiment 1

Figure 1:
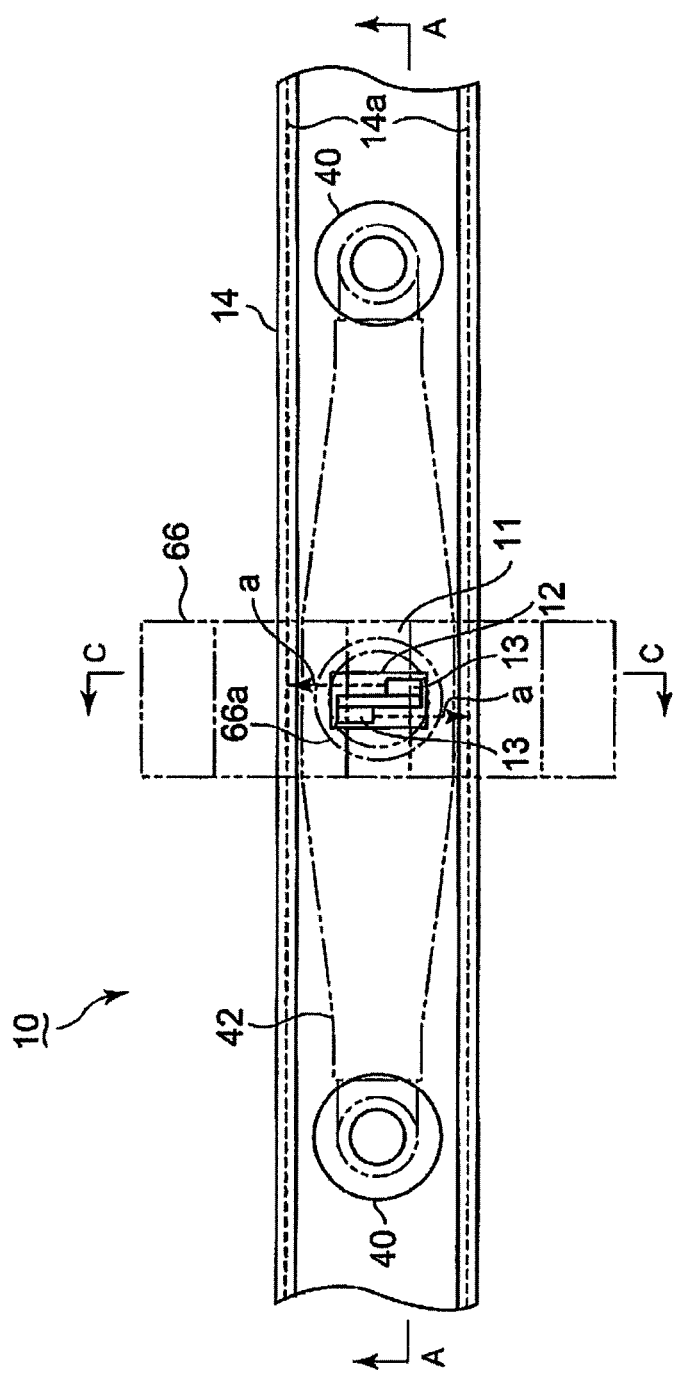
FIG. 1 is a sectional plane view (along B-B in FIG. 2) illustrating a first embodiment of the present invention.
Figure 2:
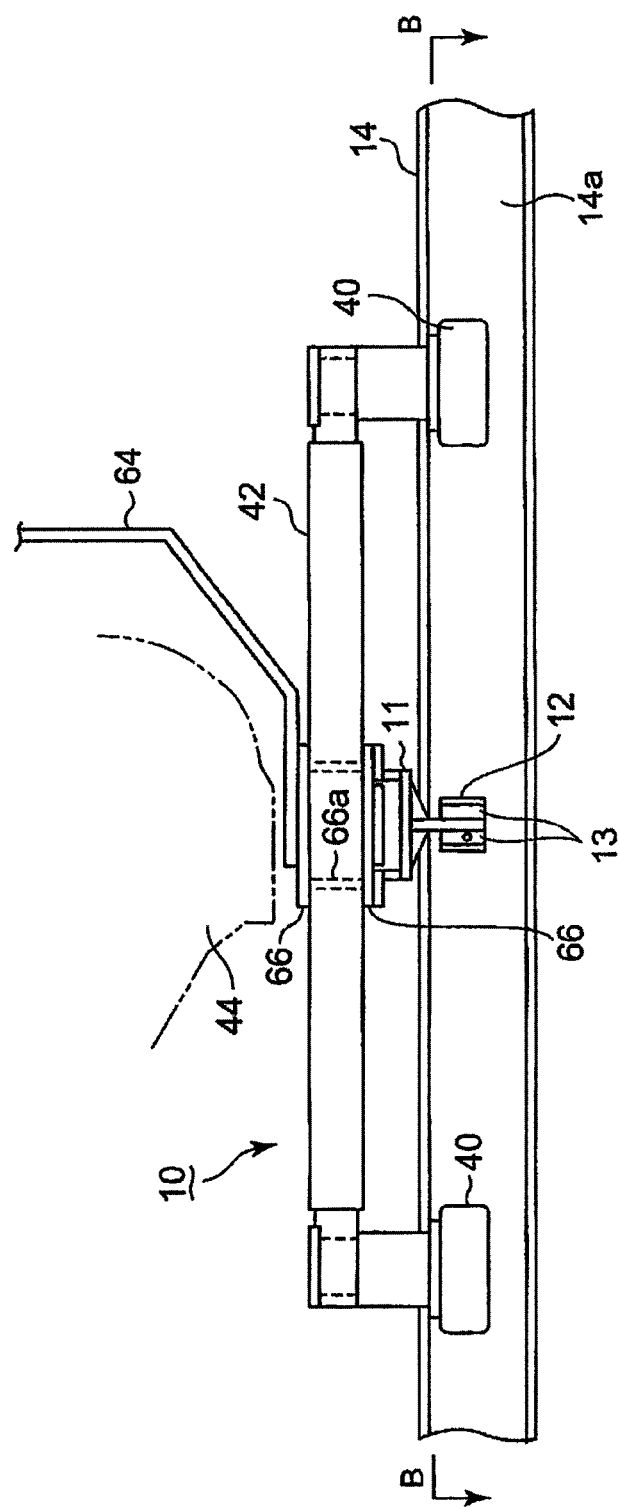
FIG. 2 is a sectional elevation view (along line A-A in FIG. 1) illustrating the first embodiment of the present invention.
Figure 3:
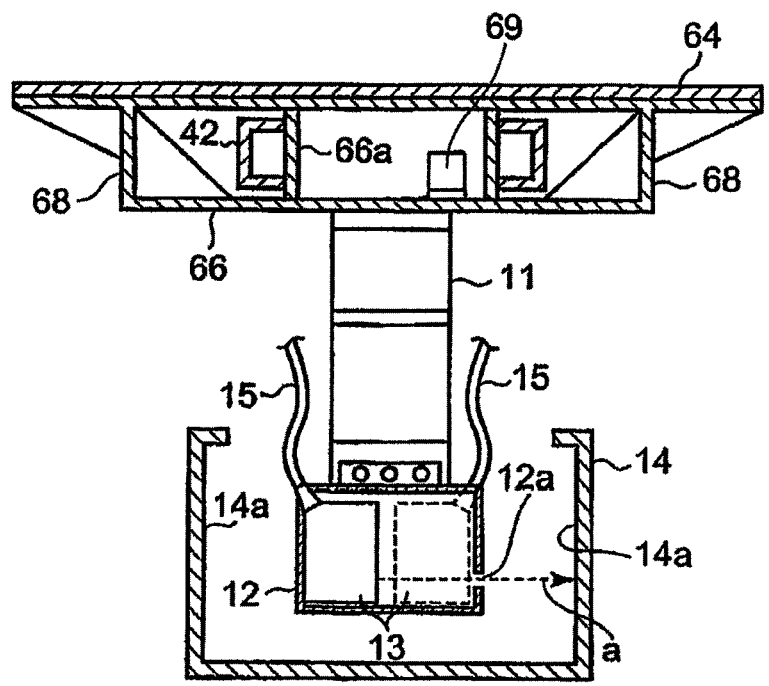
FIG. 3 is a sectional side view (along line C-C in FIG. 1) illustrating the first embodiment.

Explanation will be made of a first embodiment of a track type transportation system in the present invention with reference to FIGS. 1 to 3 in which FIG. 1 is a sectional plan view (along line B-B in FIG. 2) illustrating a fail-safe mechanism in this embodiment, FIG. 2 is a sectional elevation view (along line A-A in FIG. 1) and FIG. 3 is a sectional side view (along line C-C in FIG. 1).

The configurations of an automatic steering mechanism and the fail-safe mechanism 10 in this embodiment are the same as those explained in the above-mentioned Patent Document 1, and accordingly, explanation thereto will be omitted. In this embodiment, there is provided displacement meters for detecting a deviated value of the pivotal center of a protection arm with respect to a protection track (a deviation value of the pivotal center of the protection arm 42 widthwise of the protection track 42) in combination of the automatic steering mechanism and the fail-safe mechanism as disclosed in the Patent Document 1.

Referring to FIGS. 1 to 3, the protection arm 24 is supported at its one end part to a support bracket 64 which is secured to a bogie frame which is not shown and is suspended downward below an axle 44 at the other end part thereof so that the pivotal center of the protection arm 42 is located at the position of the center of the axle. The support bracket 64 has a protection frame 66 for rotatably holding the protection arm 42. The protection frame 66 has a center support structure for supporting a pivot fulcrum 66a of the protection arm 42 so as to interpose the fulcrum 66a between both upper and lower side parts thereof.

Further, the protection frame 66 is formed with left and right longitudinal walls 68, 68 which have a function capable of limiting a pivoting range of the protection arm 42. A support bracket 11 is secured to the lower part of the protection frame 66. The support bracket 11 is suspended downward from the center position of the axle 44 in the protection frame 66, having its lower end part which is inserted in the protection track 14 and which is attached thereto with a sensor cover 12, and a pair of laser type displacement meters 13, 13 are accommodated in the sensor cover 12.

The sensor cover 12 are coated over its outer surface with a black body or dark color body, except parts corresponding to inlet and outlet paths of detection waves in order to serve as a photoabsorption element.

It is noted that a controller 69 is accommodated in the protection frame 66 so as to receive measuring signals which exhibit respectively distances between the left and right side walls 14a, 14a of the protection track 14 and the mounted positions of the pair of laser type displacement sensors 13, 13 which receive reflection waves from the side walls 14a, 14b of the protection track 14 so as to measure the distances, in order to detect left and right deviated values of the vehicle with respect to the protection track 14.

Figure 4:
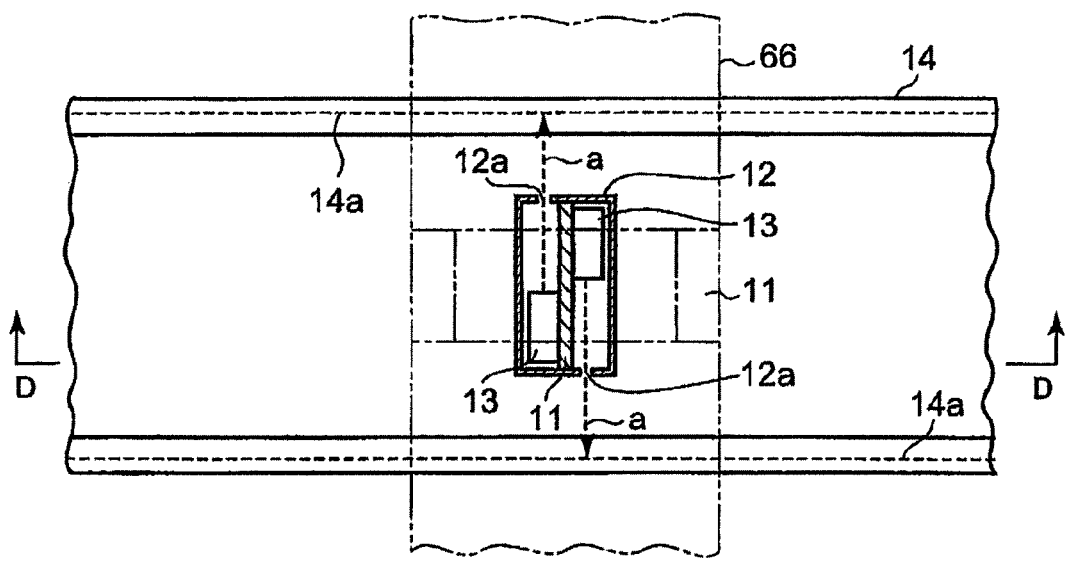
FIG. 4 is an enlarged view (sectional view along line E-E in FIG. 5) illustrating a part shown in FIG. 1.
Figure 5:
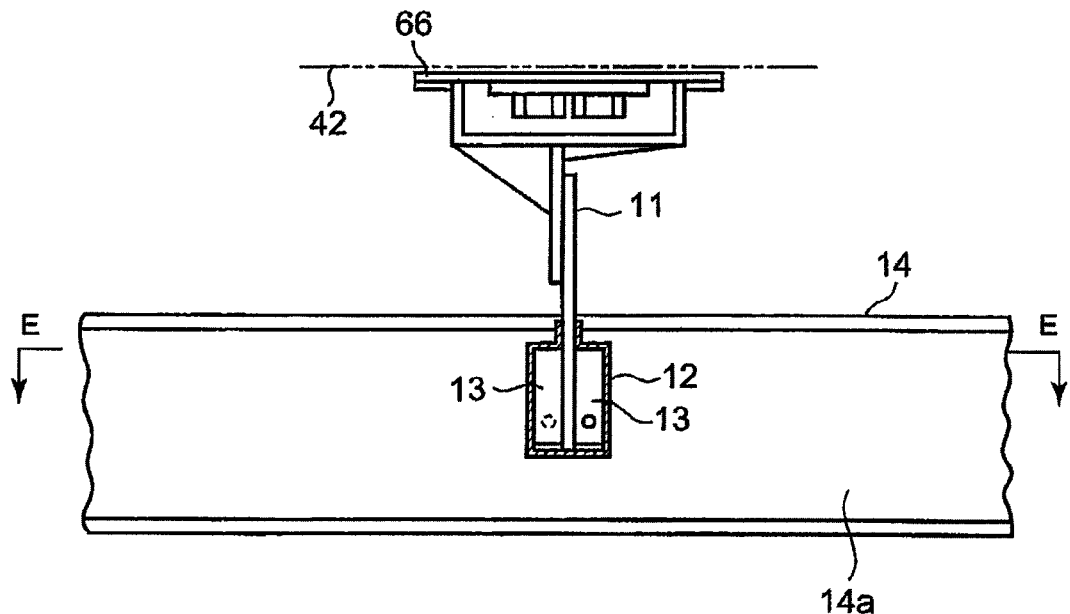
FIG. 5 is an enlarged view (sectional view along E-E line in FIG. 4)

FIG. 4 is an enlarged view illustrating a part shown in FIG. 1, and FIG. 5 is an enlarged view illustrating a part shown in FIG. 2. Referring to FIGS. 4 and 5, the laser type displacement meters 13, 13 are located at the center of the axle, widthwise of the protection track 14. Further, they are arranged so that the directions of emission of laser beams a are horizontal and are orthogonal to the respective left and right side walls 14a, 14a of the protection track 14. The laser type displacement meters are arranged so as to irradiate the laser beams a onto the respective left and right side walls 14a, 14a. It is noted in FIG. 13 that the laser type displacement sensors 13, 13 are connected to cables 15 for connecting them to a power source.

In the first embodiment having the above-mentioned configuration, the laser beams a are irradiated from the laser type displacement meters 13, 13 onto the side walls 14a of the protection track 14, and reflection beams reflected back from the side walls 14a are led into the laser type displacement meters 13, 13 so as to measure distances between the laser type displacement meters 13, 13 and the side walls 14a, thereby it is possible to detect left and right deviated values of the pivotal center of the protection arm 42 with respect to the protection track 14.

According to the first embodiment in which the laser type displacement meters 13, 13 are arranged below the position of the center of the axle 44, the left and right deviated values with respect to the protection track can be detected with a high degree of accuracy. Further, the laser type displacement meters 13, 13 are highly responsive and of noncontact type, and accordingly, they are never worn.

Thus, with the provision of the displacement meters 13, 13 for detecting a deviated value of the vehicle widthwise of the track in a track type transportation system incorporating an automatic steering mechanism and a fail-safe mechanism 10 comprising a protection arm 042 mounted thereto with protection wheels 040, and a protection track 14, automatic steering can be carried out with a high degree of accuracy.

However, the laser type displacement meter cannot not carry out precise detection unless the distance to an object to be detected is not less than a predetermined value. In this embodiment in which the pair of laser type displacement meters 13, 13 are arranged in the protection track at the center of the axle 44, and the laser type displacement meters 13, 13 are arranged, horizontally, and orthogonal to the respective left and right side walls 14a, thereby it is possible to assure sufficient distances between the laser type displacement sensors 13, 13 and the side walls 14a within the protection track 14 having a narrow width.

Further, with the provision of the cover surrounding the laser type displacement meters 13, 13, reflection light from disturbance light reflected upon the side walls of the protection walls can be prevented from being overlapped with the laser beams emitted from the laser type displacement meters 13, 13. Thus, the detection accuracy of the laser type displacement meters can be enhanced. Further, with the provision of the sensor cover 12, there can be enhanced the environmental resistance of the laser type displacement meters 13, 13 as to rain water and sunlight.

It is noted that even in this embodiment, noncontact type ultrasonic displacement meters may be used with identical detection effects, instead of the laser type displacement meters.

Embodiment 2

Figure 6:
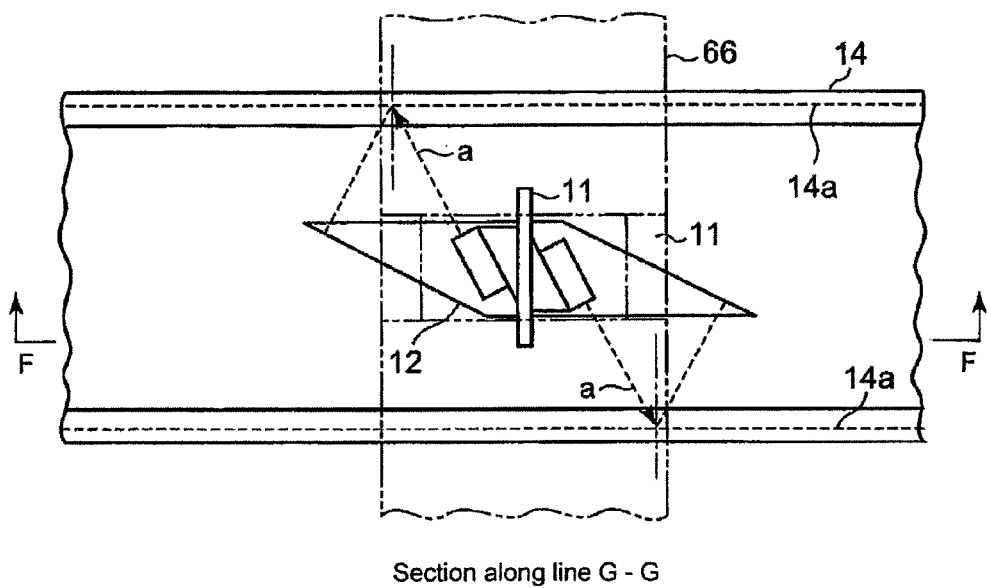
FIG. 6 is a sectional plan view (along line G-G in FIG. 7) illustrating a second embodiment of the present invention.
Figure 7:
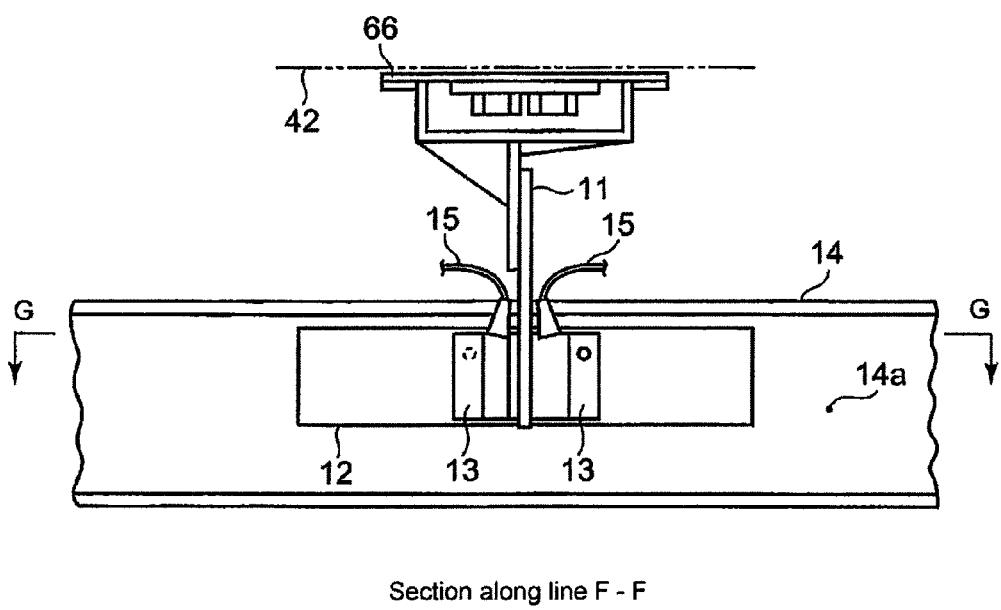
FIG. 7 is a sectional elevation view (along line F-F in FIG. 6) illustrating the second embodiment.

Next, explanation will be made of a second embodiment of the present invention with reference to FIGS. 6 and 7 in which FIG. 6 is a sectional plan view (along line G-G in FIG. 7) and FIG. 7 is a sectional elevation view (along line F-F in FIG. 6). In this embodiment, in comparison with the first embodiment, a pair of laser type displacement meters 13, 13 are located at the position of the center of the axle and are arranged so that laser beams a therefrom are irradiated onto the side walls 14a of the protection track 14, obliquely thereto with oblique angles. Further, a sensor cover 12 surrounding the laser type displacement meters 13, 13 are also provided.

With the embodiment stated above, the irradiation distances of the laser beams a from the laser type displacement meters 13, 13 to the left and right side walls 14a can be sufficiently ensured. Thus, the irradiation distances of the laser beams a can afford carrying out precised measurement, thereby it is possible to enhance the degree of accuracy of detection of deviated values with respect to the protection track 14. Further, with the provision of the sensor cover 12 surrounding the laser type displacement meters 13, 13, it is possible to prevent deterioration of detection caused by entrance of disturbance light and reflection thereof, and as well entrance of sunlight or rain water.

Embodiment 3

Figure 8:
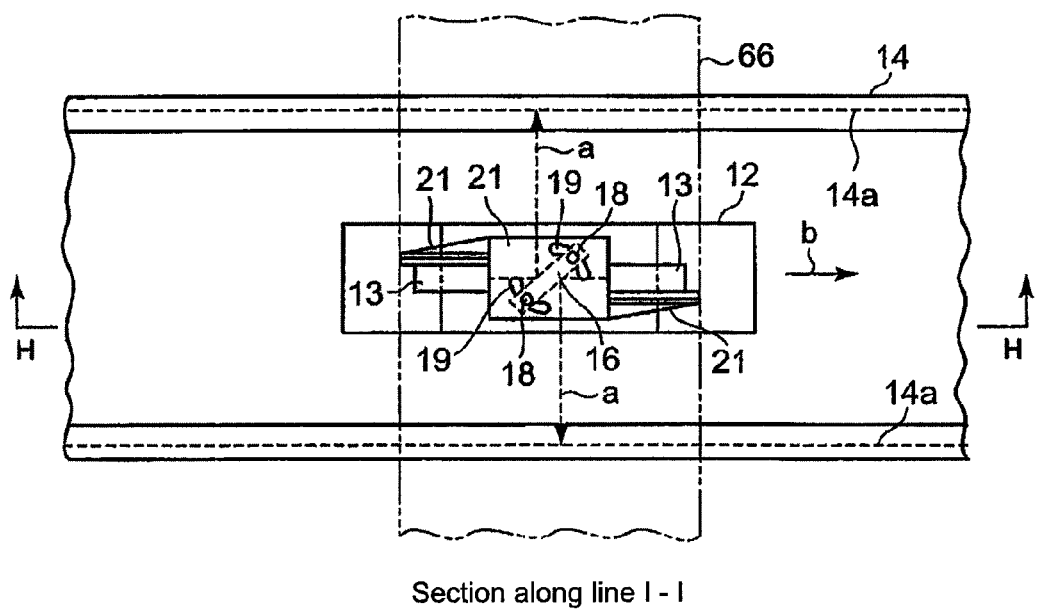
FIG. 8 is a sectional plan view (along line I-I in FIG. 9) illustrating a third embodiment of the present invention.
Figure 9:
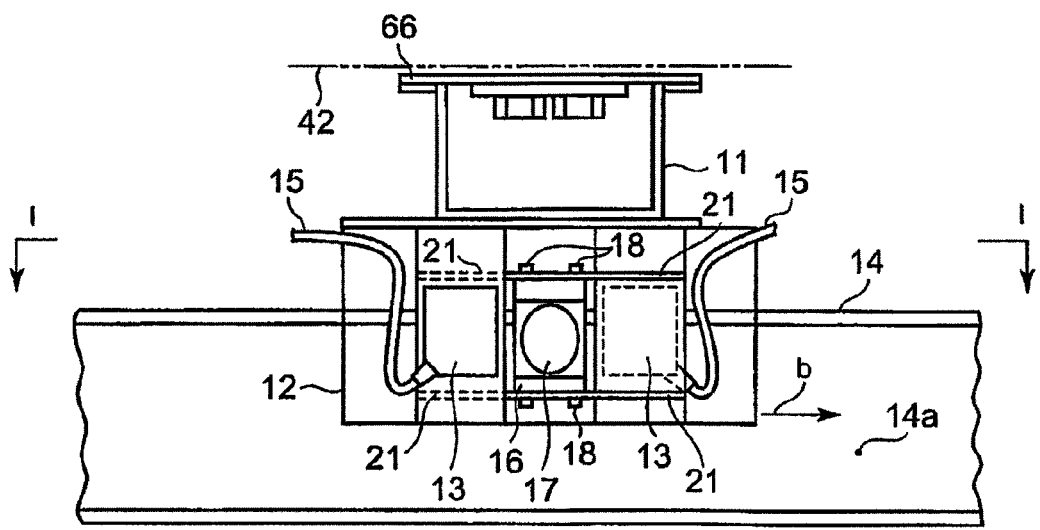
FIG. 9 is a sectional elevation view (along line H-H in FIG. 8) illustrating the third embodiment of the present invention.

Next, explanation will be made of a third embodiment of the present invention with reference to FIGS. 8 and 9 in which FIG. 8 is a sectional plan view (along line I-I in FIG. 9), and FIG. 9 is a section elevation view (along line H-H in FIG. 8), In this embodiment, a pair of leaser type displacement meters 13, 13 which are provided at the pivotal center of the protection arm by the support bracket 11, are arranged being directed in the running direction b of the protection wheels 42. Further, a reflector frame 16 is set between the displacement meters. The support bracket 11 is secured in its center part with upper and lower fixing plates 21 interposing therebetween the reflector frame 16 which is therefore held between the fixing plates 21 and extended in a horizontal direction.

The reflector frame 16 is fixed thereto with reflectors 17, and the reflector frame 16 is attached at its upper and lower surface with bolts for fixing the reflector frame 16 to the fixing plates 21. The bolts are loosely fitted in elongated holes 16 formed in the fixing plates 21 so as to be slidable in the elongated holes 16 in order to adjust the attaching angle of the reflector frame 16. Further, there are provided a sensor cover 12 for surrounding the laser type replacement meters 13, 13 and the reflector frame 16.

With the configuration of this embodiment, the pair of the laser type displacement meters 13, 13 irradiate their laser beams a onto the reflectors 17. The reflectors 17 have a fixing angle which is adjusted so as to reflect the laser beams a emitted from the laser type displacement meters 13, 13 onto the side walls 14a of the protection track 14. Thus, the laser beams 2 reflected by the reflector 17 can be directed to the side walls 14a of the protection track 14, orthogonal thereto.

Thus, in this embodiment, the deviated value of the pivotal center of the protection arm can be detected. According to the present invention, since the laser type displacement meters 13, 13 are arranged being directed in the running direction b of the protection wheels 42, the laser type displacement meters 13, 13 can be simply arranged in the narrow space of the protection track 14. Thus, the distances between the laser type displacement meters 13, 13 and the side walls 14a can be sufficiently ensured, and accordingly, the deviated value can be detected with a high degree of accuracy. Further, by changing the fixing angle of the reflector frame 16, the incident angle of each laser beam a onto the associated side wall 14a can be set to a desired value.

Embodiment 4

Figure 10:
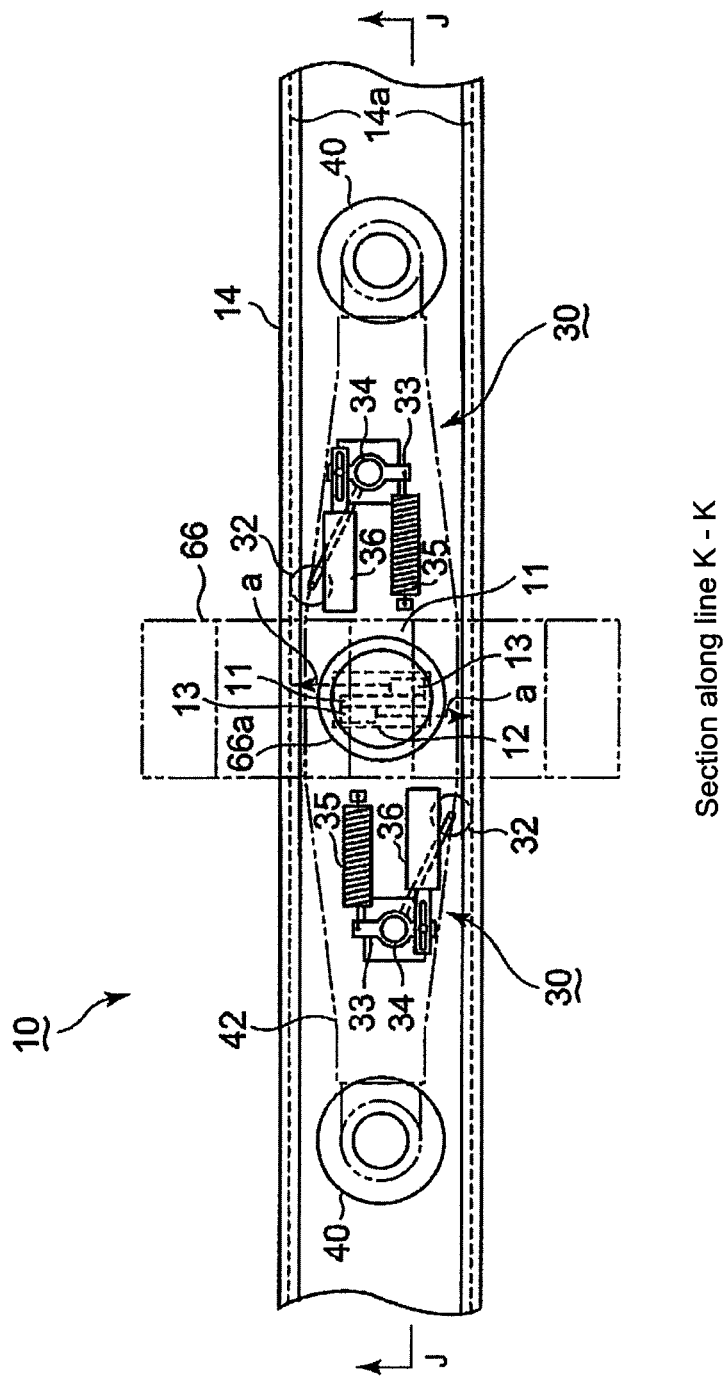
FIG. 10 is a sectional plan view (along line K-K in FIG. 11) illustrating a fourth embodiment of the present invention.
Figure 11:
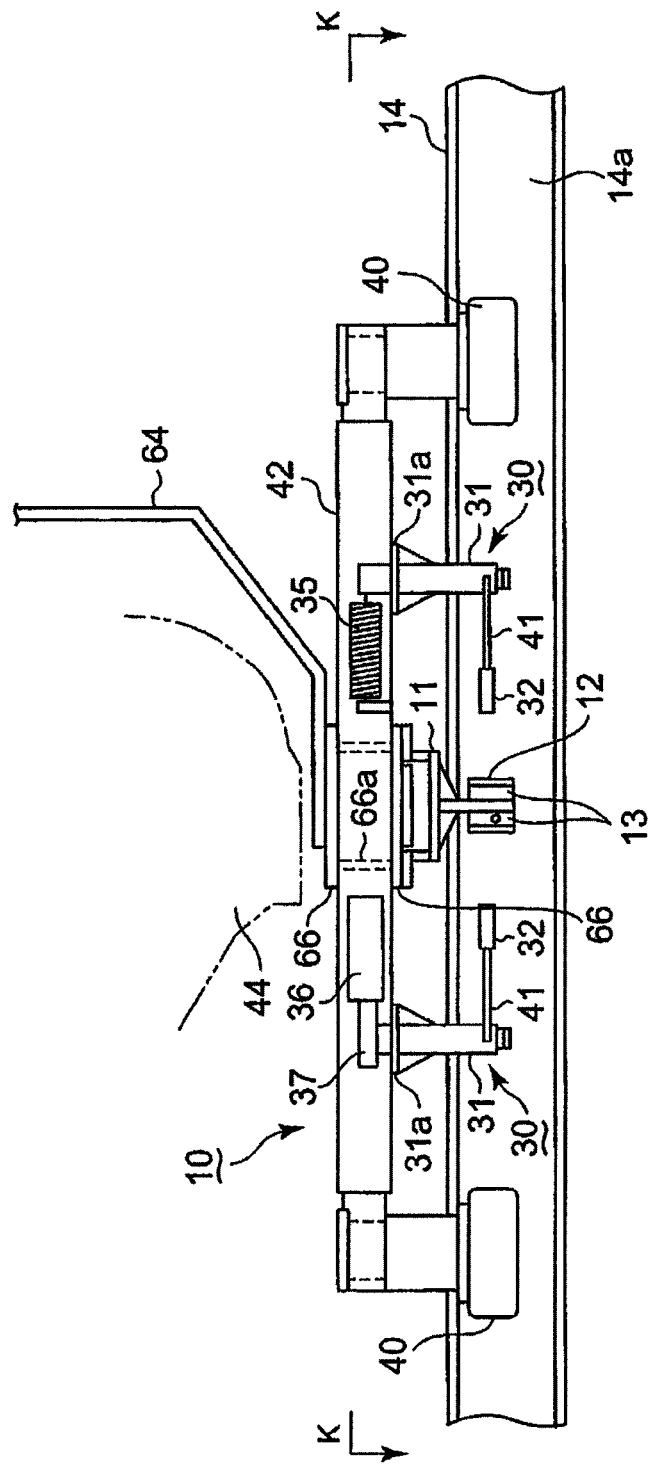
FIG. 11 is a sectional elevation view (along line J-J in FIG. 10) illustrating the fourth embodiment.

Next, explanation will be made of a fourth embodiment of the present invention with reference to FIGS. 10 to 13 in which FIG. 10 is a sectional plan view (along line K-K in FIG. 11), FIG. 11 is a sectional elevation view (along line J-J in FIG. 11), and which illustrate a fail-safe mechanism 10 in this embodiment. Referring to FIGS. 10 and 11, laser type displacement meters 13, 13 which constitute a configuration explained in any one of the embodiments 1 to 3 are mounted below a protection frame 66, being arranged at the pivotal center of the protection arm 42. Further, the protection arm 42 is attached to a pair of contact type displacement meters 30 between which the laser type displacement meters 13, 13 are interposed. The configuration of these contact type displacement meters 30 will be hereinbelow explained.

Figure 12:
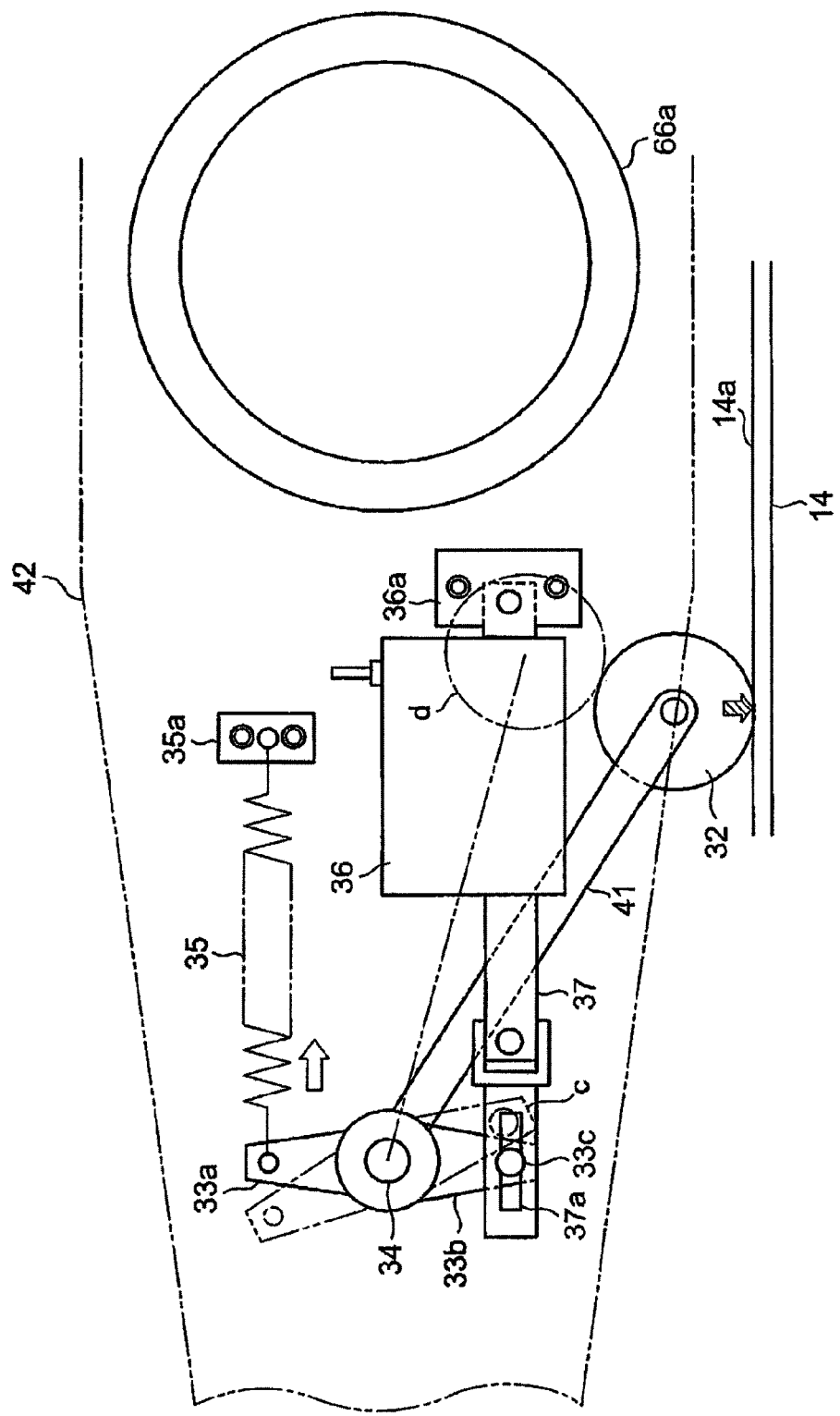
FIG. 12 is a plan view illustrating the fourth embodiment.

Support posts 31 for supporting rollers 32 in a protection track 14 are attached to the lower surface of the protection arm 42 through the intermediary of joint portions 31a. Referring to FIG. 12 which is a plan view, a pair of roller levers 33 are mounted to the upper part of each support post 31 which is inserted in the protection arm 42, so as to be rotatable about a fulcrum shaft 34 as a center. One 33a of the roller levers is connected at its one end part to one end part of a coil spring 35 whose the other end is fixed to the lower surface of the protection arm 42 in its fixing part 35a.

The other one 33b of the roller levers is connected to the piston rod 37 of an electric motor driven cylinder 36 through the intermediary of a pin 33 attached to the roller lever 33b. The electric motor driven cylinder 36 is fixed to the lower surface of the protection arm 42 by means of the fixing portion 36a. The piston rod 37 is formed therein with an elongated hole 37a into which the pin 33c is inserted so as to be slidable therein.

Figure 13:
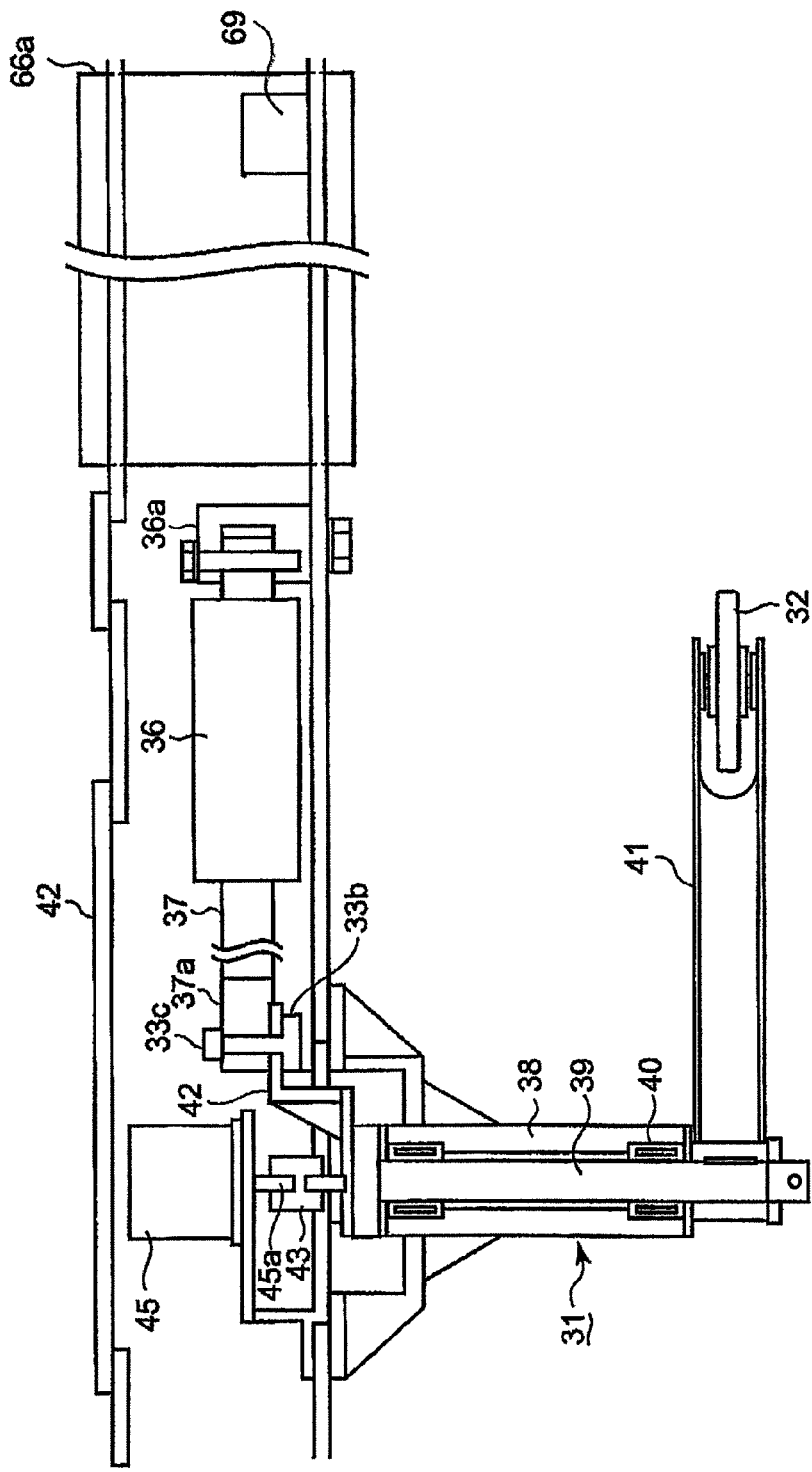
FIG. 13 is an elevation view illustrating the fourth embodiment.

Referring to FIG. 13 which is a sectional elevation view, the support post 31 is provided with a pivotal shaft 39 within the cylinder 38, and the pivotal shaft 39 is rotatably supported by means of a bearing 40. The pivotal shaft 39 is coupled at its lower end part with an arm 41 for rotatably supporting a roller 32, through the intermediary of a connecting rod 42 and is coupled at its upper end part to a detection shaft 45a of a rotary encoder or an angle sensor 45 through the intermediary of a coupling 43. Thus, the rotating angle of the pivotal shaft 39 is detected by the rotary encoder or the like 45, and a position of the roller 32 is detected from the detected value thereof, and further, a deviated value of the pivotal center of the protection arm 42 with respect to the protection track 14 can be detected.

It is noted that a controller 69 which is accommodated in the protection frame 66 receives therein measurement signals which indicate distances between the respective mounted positions of the noncontact type displacement meters 13, 13 and the side walls 14a of the protection track 14, which are measured by the pair of the noncontact type displacement meters 13, 13 which receive reflection waves from the side walls 14a, 14a of the protection track 14, and therefore, detects left and right deviated values of the vehicle with respect to the protection track 14. In addition, when the pair of the leaser type displacement meters 13, 13 issue a malfunctioning signal (for example, the sum of the left and right deviated values of the vehicle with respect to the protection track 14, which are delivered from the laser type displacement meters 13, 13 corresponds to the protection track space (widthwise length) (which can be obtained by computing a differential between the laser type displacement meters 13, 13 or a trigonometric function), and malfunctioning can be determined in the case of indication of a numerical value which does not correspond to the above-mentioned numerical value).

In the embodiment having the above-mentioned configuration, a deviated value of the pivotal center of the protection arm with respect to the protection track 14 can be detected by the laser type displacement meters 13, 13 during running of the vehicle while the piston rod 37 is retraced by energizing the electric motor driven cylinder 30 in the contact type displacement meters 30. Thus, the roller lever 33b is pivoted up to positions indicated by c in order to retract the roller 33b at its stand-by position.

When the laser type displacement meters 13, 13 are malfunctioning so that no deviated values of the pivotal center of the protection arm 42 can be detected, the electric motor driven cylinder 36 for the roller is energized so as to extend the piston rod 37.

More specifically, when the controller 69 determines such a case that the leaser type displacement meters are malfunctioning, that is, the detection cannot be made, and energizes the electric motor driven cylinder 37 in order to change over into the contact type displacement meter, so as to extend the piston rod 37. Thus, the roller 32 is pressed against the side wall 14a of the protection track 14 by the resilient force of the coil spring 35. In this case, the angle of the roller 32 is detected by the rotary encoder 45, thereby it is possible to detect a deviated value of the pivotal center of the protection arm with respect to the protection track 14.

According to the present invention, the deviated value of the pivotal center of the protection arm 42 with respect to the protection track 14 can be detected by the noncontact type laser displacement meters 13, 13 with a high degree of accuracy and a high degree of responsiveness. Further, since they are of noncontact type, no wearing problem is caused.

In the case of malfunctioning of the laser type displacement meters 13, 13, a deviated value of the pivotal center of the protection arm can be detected with the use of the contact type displacement meters, thereby it is possible to enhance the reliability of the deviation detecting means.

More specifically, when the controller 69 determines occurrence of malfunctioning of the laser type displacement meters 13, 13, the contact type displacement meters 30 are operated, instead thereof, and accordingly, the deviated value of the pivotal center of the protection arm can be detected, thereby it is possible to enhance the reliability of the deviation detecting means.

Further, in this embodiment, each of the roller support mechanism is composed of the arm 41, the cylinder 38 and the pivotal shat 39, and accordingly, the roller support mechanism can have a high rigid structure.

As stated above, according to this embodiment, even upon occurrence of a failure of the laser type displacement meters 13, 13 which are noncontact type displacement meters, the automatic steering of the vehicle can be made, that is, the normal operation of the vehicle can be continued further. It is noted that ultrasonic type displacement meters may be used instead of the laser type displacement meters 13, 13 which are used as the noncontact type displacement meters in this embodiment.

Embodiment 5

Figure 14:
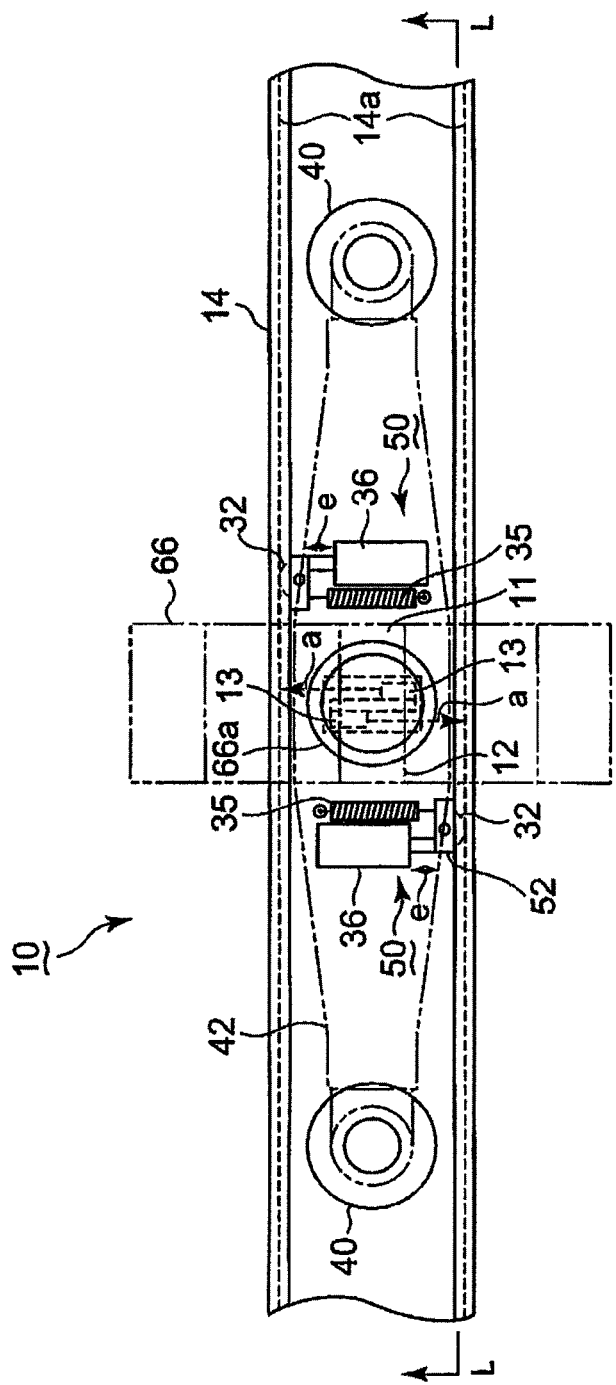
FIG. 14 is a sectional plan view (along line M-M in FIG. 15) illustrating a fifth embodiment of the present invention.
Figure 15:
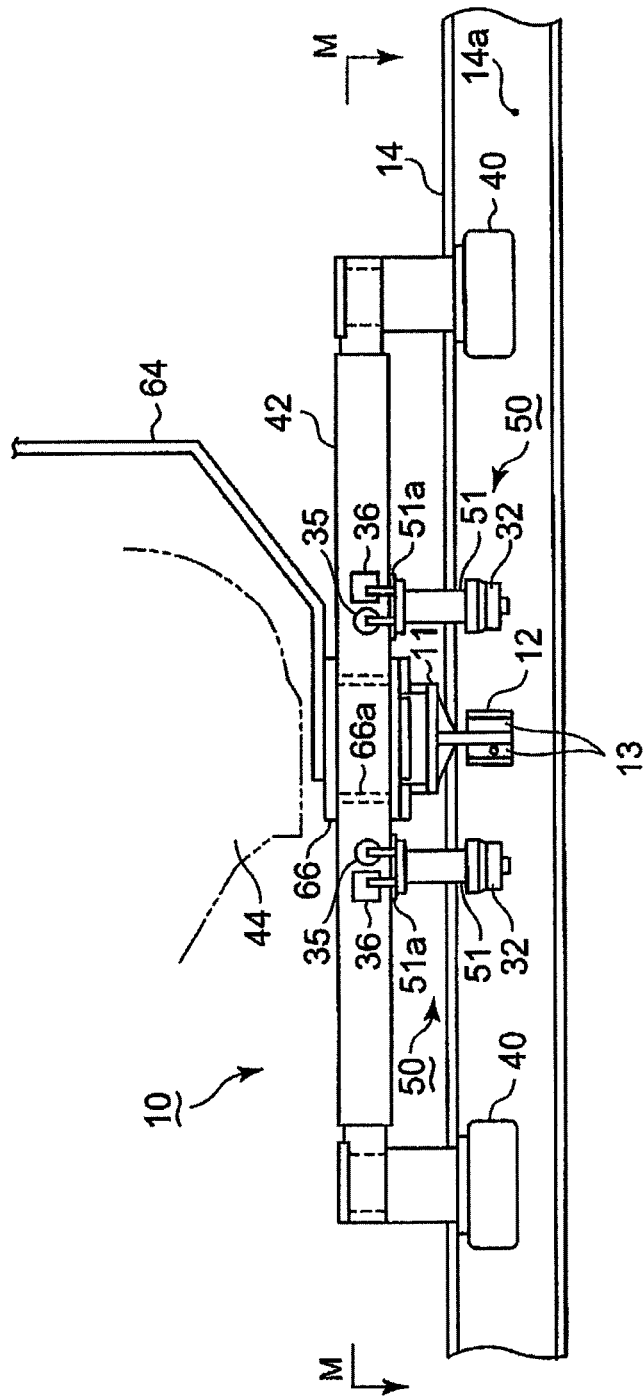
FIG. 15 is a sectional elevation view (along line L-L in FIG. 14) in the fifth embodiment of the present invention.
Figure 16:
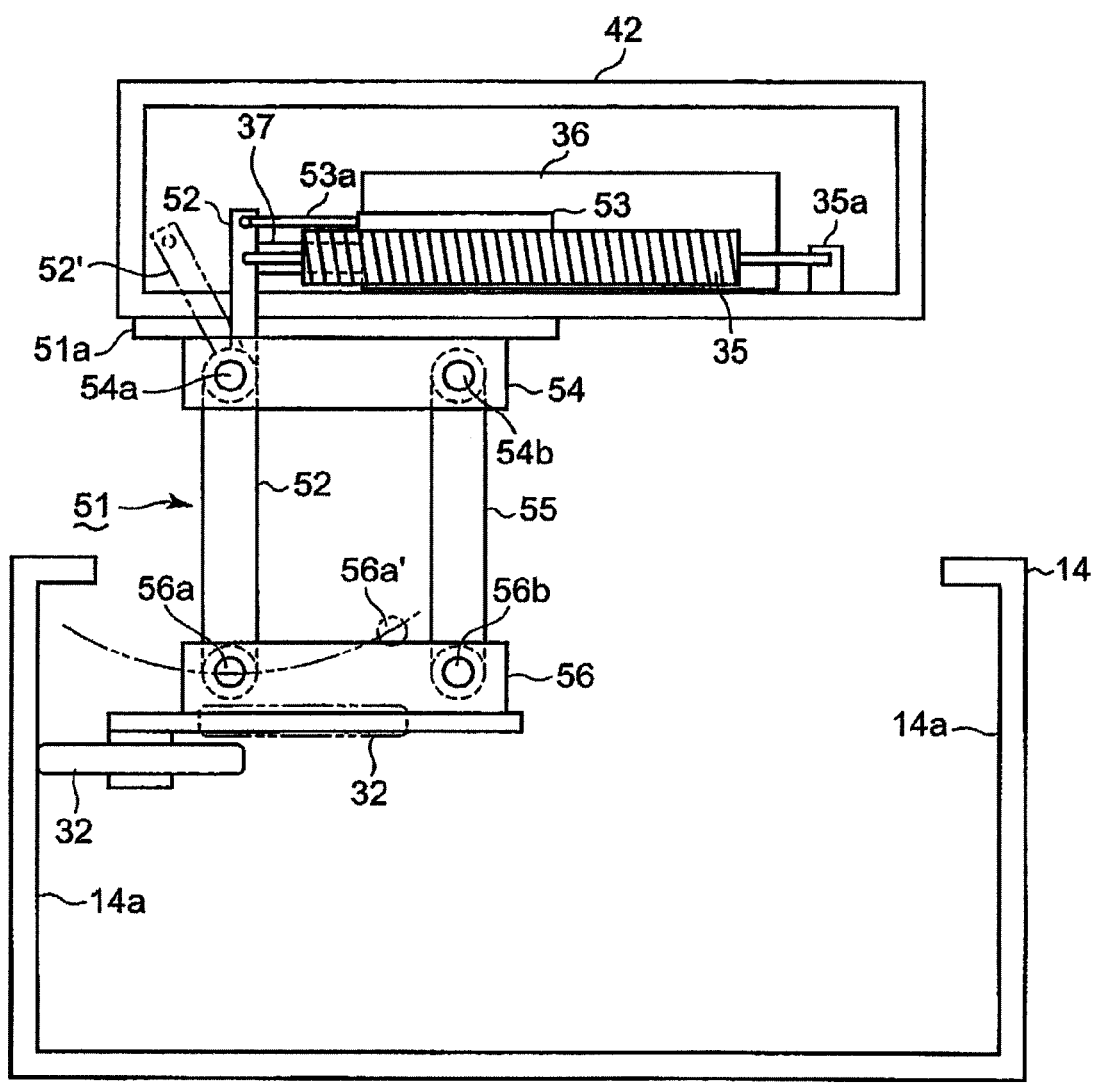
FIG. 16 is an elevation view illustrating the fifth embodiment.

Next, explanation will be made of a fifth embodiment of the present invention with reference to FIGS. 14 to 16 in which FIG. 14 is a sectional plan view (along line M-M in FIG. 15), FIG. 15 is a sectional elevation view (along line L-L in FIG. 14) and FIG. 16 is an elevation view. Referring to FIGS. 14 to 16, the configuration in which the laser type displacement meters 13, 13 are used as the noncontact type displacement meters is the same as that of the fourth embodiment, and accordingly, the explanation of this configuration will be omitted. This configuration of this embodiment is the same as that of the forth embodiment, except the configuration of a contact type displacement meter 50 which will be hereinbelow explained.

A support post 51 for supporting a roller 32 in the protection track 14 is vertically attached to the lower surface of a protection arm 42 through the intermediary of a joint portion 51a. Referring to FIG. 14, a coil spring 35 and an electric motor driven cylinder 36 are arranged in parallel on the upper part of the support post 51 which is inserted in the protection arm 42, being directed widthwise of the protection track 14. A frame 52 is coupled to one end of the coil spring 35 and the piston rod of the electric motor driven cylinder 36.

Referring to FIG. 16, the electric motor driven cylinder 36 is secured to the inside upper surface of the protection arm 42, and as well, the other end part of the coil spring 35 is secured to the inside upper surface of the protection arm 42 with a fixing portion 35a. Further, a frame 52 is connected to a detection bar 53 of the displacement meter 53.

A link acceptor 54 is jointed to the lower surface of the protection arm 42 through the intermediary of a joint part 51a. The frame 52 is rotatably attached to a fulcrum shaft 54a provided to the link acceptor 54 while a suspension link 55 is rotatably attached to another fulcrum shat 54b of the link acceptor 54, in parallel with the frame 52.

Further, the frame 52 and the suspension link 55 are rotatably connected respectively to fulcrum shafts 56a, 56b provided to a roller acceptor 56 which is attached rotatably thereto with the roller 32.

In the embodiment having the above-mentioned configuration, during the running of the vehicle, the method of detecting the pivotal center of the protection arm with respect the protection track 14 by means of the laser type displacement meters 13, 13 is similar to that of the fourth embodiment. Meanwhile, in the contact type displacement meter 50, the electric motor driven cylinder 36 is energized so as to extend the piston rod 37 in order to turn the frame up to a position 52' shown in FIG. 16, about the fulcrum shaft 54 as a rotating center. As a result, the fulcrum shaft 56a and the roller 32 are retracted to the positions 56', 32', respectively.

When the laser type displacement meters 13, 13 are malfunctioning, that is, the detection becomes impossible. The electric motor driven cylinder 36 is energized so as to retract the piston rod 37.

More specifically, if the controller 69 determines such a case that the laser type displacement meters 13, 13 are malfunctioning so that the detection becomes impossible, the controller 69 (refer to FIGS. 3 and 13) operates the contact type displacement meter, instead of the noncontact type one, and therefore, the electric motor driven cylinder 36 is energized so as to retract the piston rod 37.

Thus, the frame 52 receives the compression force from the coil spring 35, and accordingly, the roller 32 is pressed against the side wall 14a of the protection track 14. In this case, since the frame 52 is connected thereto with the detection bar 53a of the displacement meter 53, an inclination of the frame 52 can be detected by the displacement mater 53. Thus, the position of the roller 32 can be detected, and accordingly, a deviated value of the pivotal center of the protection arm with respect to the protection track 14 can be detected.

According to the present invention, normally, the deviated value of the pivotal center of the protection arm can be detected by the laser type displacement meters 13, 13 having a high degree of detection accuracy and a high degree of reliability. Further, since these meters are of a noncontact type, a wearing problem is never caused.

If the laser type displacement meters 13, 13 are malfunctioning, the contact type displacement meters 50 are used so as to enable detection of the deviated value of the pivotal center of the protection arm, thereby it is possible to enhance the reliability of the deviation detecting means.

In this embodiment, in particular, the parallelogram link mechanism is used as the support mechanism for the roller 32, the configuration of the roller support mechanism which is rigid can be simplified. Thereby it is possible to surely carry out retracting of the roller 32 into the stand-by position and to surely hold the roller 32 in such a condition that it is made into close contact with the side wall during the detection by the contact type displacement meter.

Embodiment 6

Figure 17:
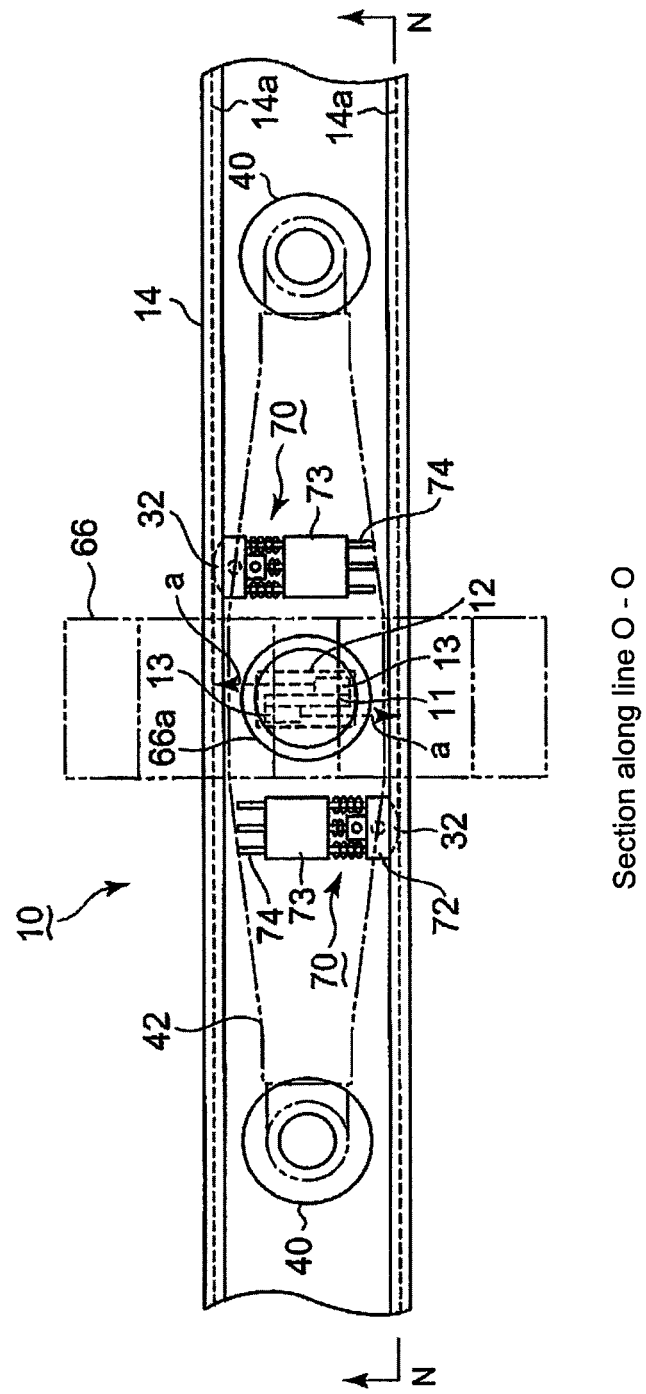
FIG. 17 is a sectional plan view (along line O-O in FIG. 18) illustrating a sixth embodiment of the present invention.
Figure 18:
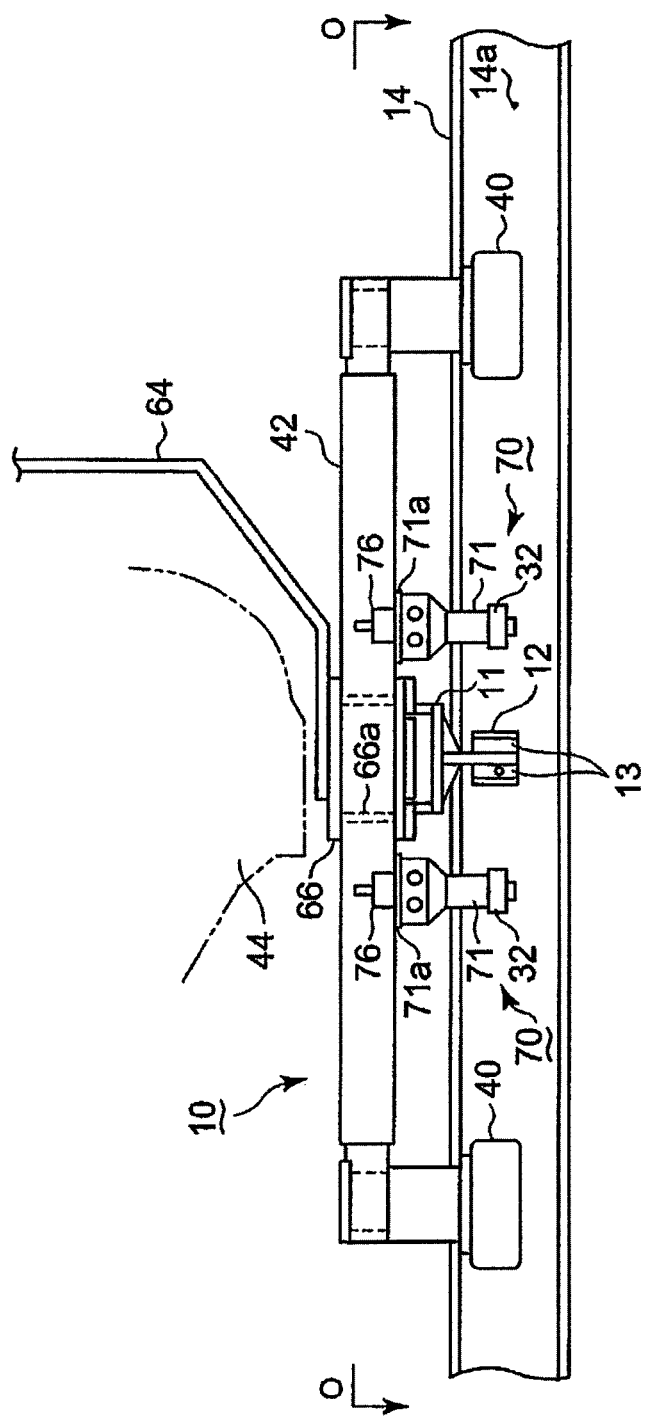
FIG. 18 is a sectional elevation view (along line N-N in FIG. 17)
Figure 19:
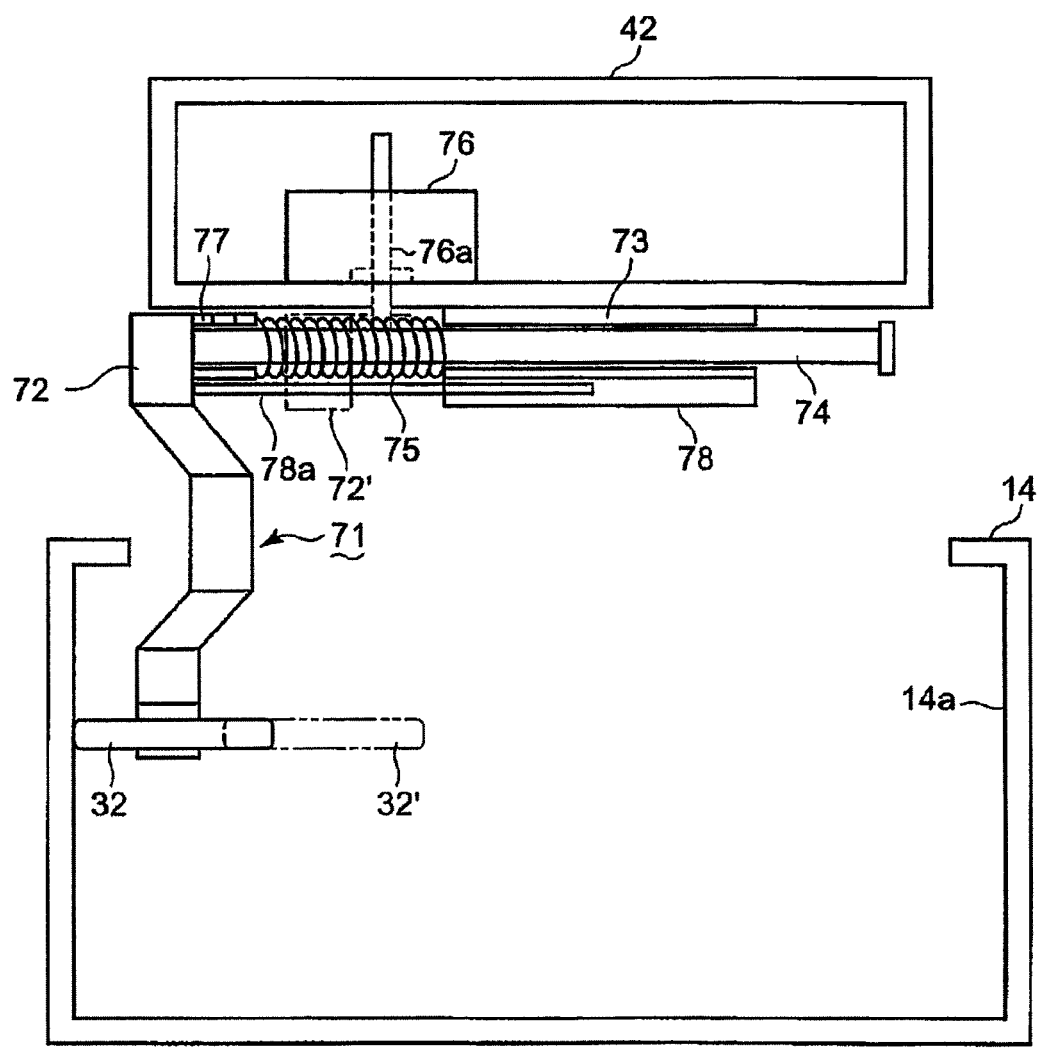
FIG. 19 is a sectional elevation view illustrating the sixth embodiment.

Next, explanation will be made of a sixth embodiment of the present invention with reference to FIGS. 17 to 19 in which FIG. 17 is a sectional plan view (along line O-O in FIG. 18), FIG. 18 is a sectional elevation view (along line N-N in FIG. 19) and FIG. 19 is an elevation view. Referring to FIGS. 17 to 19, the configuration in which the laser type displacement meters 13, 13 are used as the noncontact type displacement meters is the same as that in the fourth embodiment, and accordingly, explanation thereto will be omitted. The configuration of this embodiment are the same as that of the fourth embodiment, except the configuration of the contact type displacement meter 70. Thus, the contact type displacement meters 70 will be hereinbelow explained.

Referring to FIG. 18, a support post 71 for supporting a roller 32 in a protection track 40 is attached to the lower surface of the protection arm 42 through the intermediary of a joint plate 71a in the vertical direction. Referring to FIG. 19, a slide guide 73 also serving as the joint plate 71a is fixed to the lower surface of the protection arm 42, and a plurality of slide rods 74 arranged in parallel with one another are slidably inserted in the slide guide 73. A frame 72 is connected to the distal end parts of the slide rods 74, and a coil spring 45 is worn around each slide rod 74 and interposed between the slide guide 73 and the frame 72.

The roller 32 is rotatably mounted to the lower end part of the frame 72, and the roller 32 is pressed against the side wall 14a of the protection track 14 by the resilient force of the coil spring 75. A fixing cylinder 76 is provided in the protection arm 42, having a piston rod 76a which can be downward extended from the lower surface of the protection arm 42. When the piston rod 76 is extended toward an engaging portion 77 fixed to the rear surface side of the frame 72, the engaging part 72 is locked at its position, that is, the frame 72 can be fixed to a position 72' indicated in FIG. 1. Thus, the roller 32 can be held at a stand-by position 32'.

Further, the frame 72 is connected thereto with a detection bar 78a of the displacement meter 78.

In this embodiment having the configuration as stated above, during the running of the vehicle, the deviated value of the pivotal center of the protection arm with respect to the protection track is detected by means of the laser type displacement meters 13, 13, as is similar to the fourth embodiment. During this detection, in the contact type displacement meter 70, the fixing cylinder 76 is operated so as to downward extend the piston rod 76a from the lower surface of the protection arm 42 in order to hold the frame at the position 72'. Thereby, the roller 32 is retracted to the stand-by position 32'.

When the laser type displacement meters 13, 13 are malfunctioning, that is, the detection becomes impossible. The fixing cylinder 76 is energized so as to retract the piston rod 76a.

More specifically, if the controller 69 determines such a case that the laser type displacement meters 13, 13 are malfunctioning so that the detection becomes impossible, the controller 69 (refer to FIGS. 3 and 13) operates the contact type displacement meter, instead of the noncontact type one, and therefore, the fixing cylinder 76 is energized so as to retract the piston rod 76a.

Thus, the roller 32 is pressed against the side wall 14a of the protection track 14a by the resilient force of the coil spring 75. In this case, since the frame 72 is connected thereto with the detection bar 78a of the displacement meter 78, the a position of the roller 32 widthwise of the protection track is detected in view of a displacement 78, thereby it is possible to detect a deviated value of the pivotal center of the protection arm with respect to the protection track 14.

According to this embodiment, a deviated value of the pivotal center of the protection arm can be detected by the noncontact type laser displacement meters 13, 13 with a high degree of fineness and accuracy and a high responsiveness. Further, due to the noncontact type, no wearing problem is caused.

In the case of occurrence of malfunctioning of the laser type displacement sensors 13, 13, the contact type displacement meters 70 can be used, instead thereof, in order to detect a deviated value of the pivotal center of the protection arm, thereby it is possible to enhance the reliability of the deviation detecting means.

According to this embodiment, in particular, a highly rigid roller supporting mechanism having a simple configuration can be composed of the slide guide 73, and the plurality of slide rods 74 arranged in parallel with one another.

Embodiment 7

Figure 20:
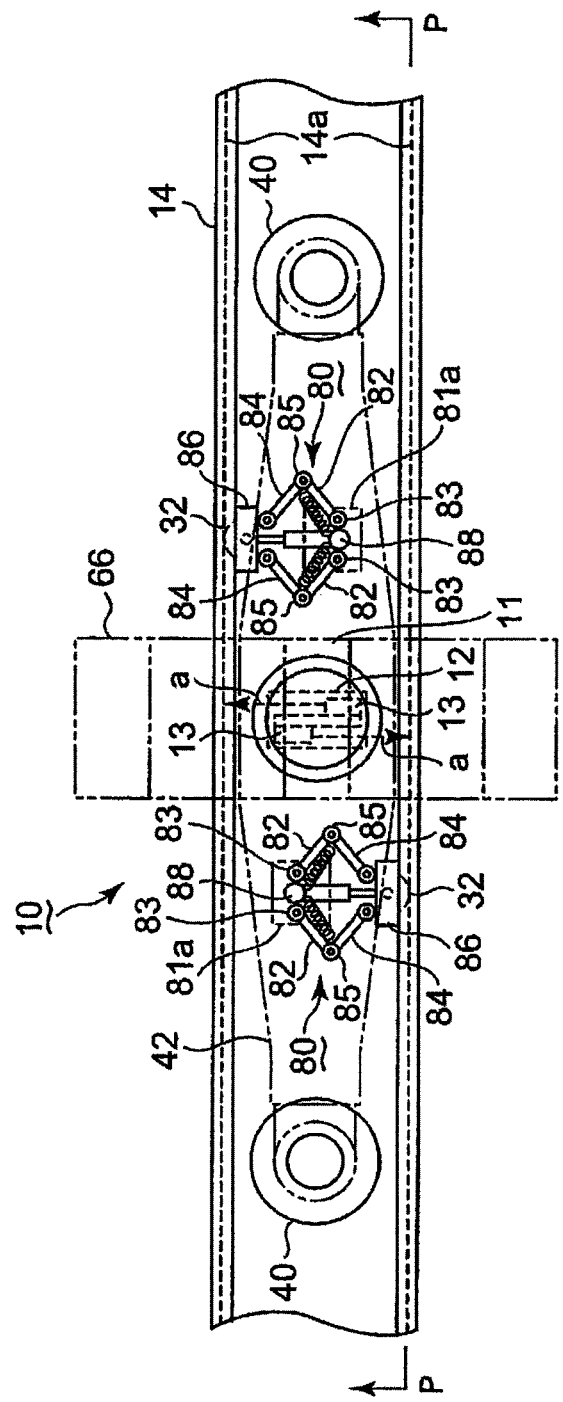
FIG. 20 is a sectional plane view (along line O-O in FIG. 21) illustrating a seventh embodiment of the present invention.
Figure 21:
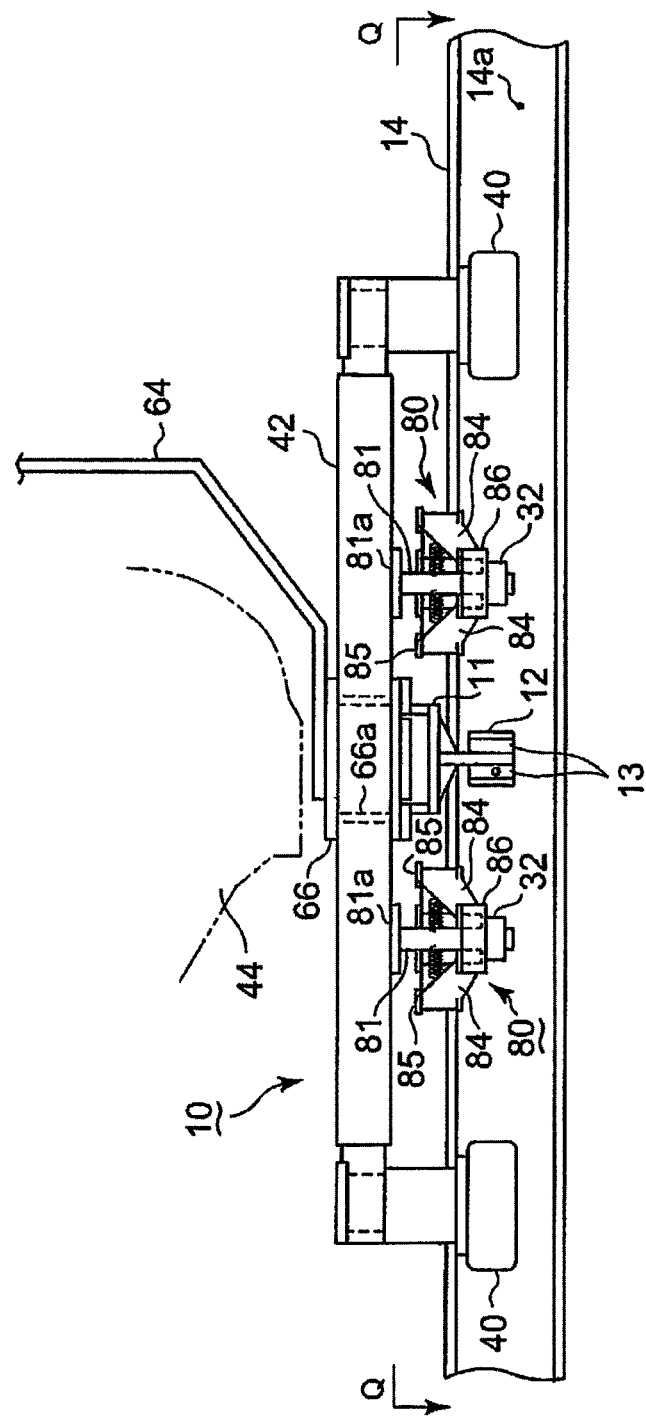
FIG. 21 is a sectional elevation view (along line P-P in FIG. 21) illustrating the seventh embodiment of the present invention.
Figure 22:
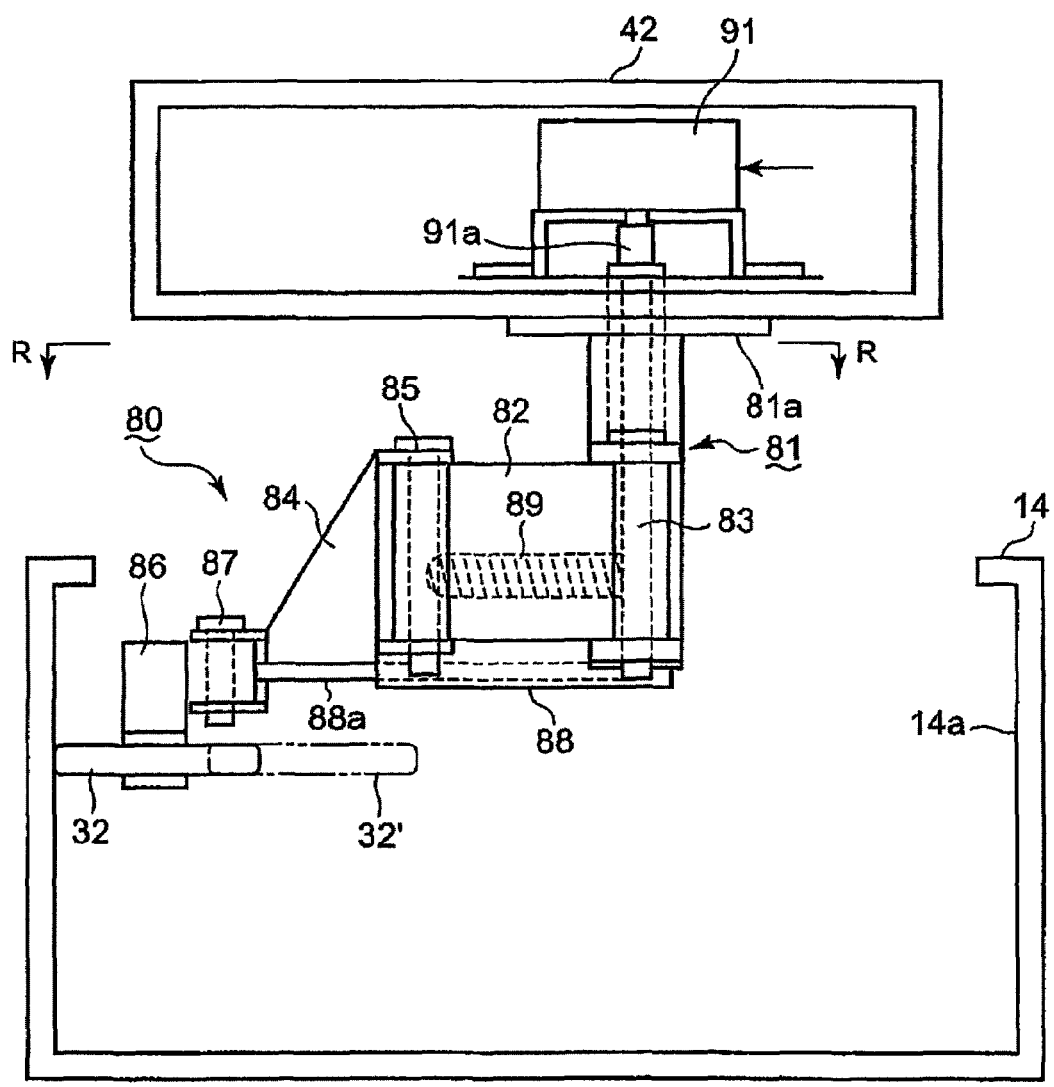
FIG. 22 is a sectional elevation view illustrating the seventh embodiment.
Figure 23:
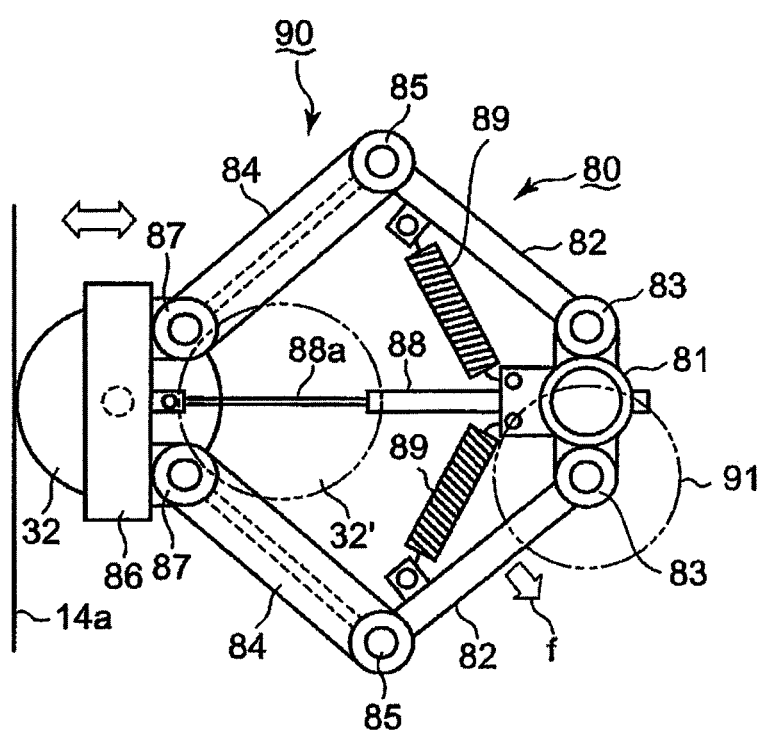
FIG. 23 is a sectional plan view (along line R-R in FIG. 22) illustrating the seventh embodiment.
Figure 24:
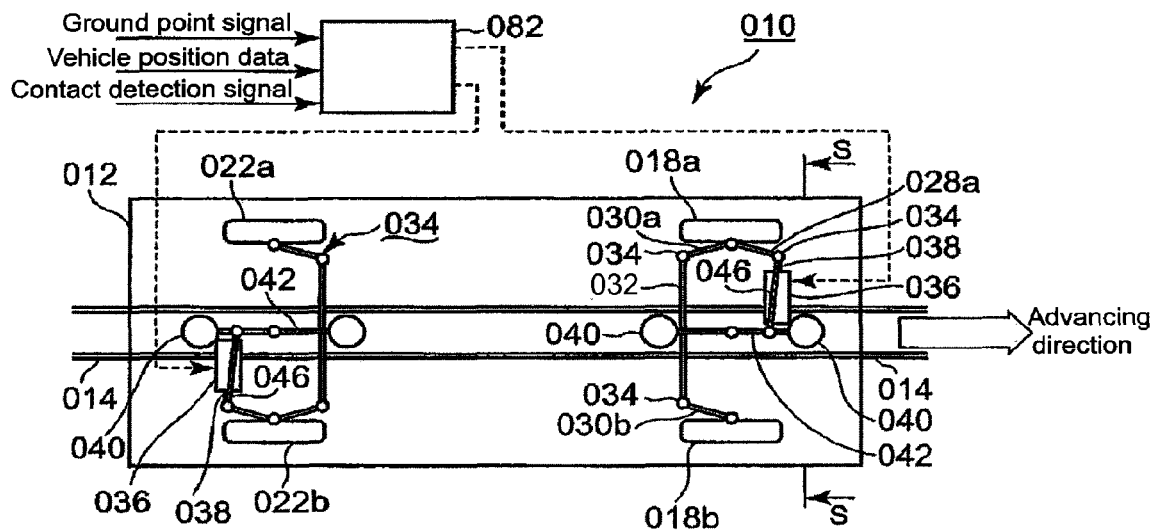
FIG. 24 is a plan view for explaining a conventional track type transportation system.
Figure 25:
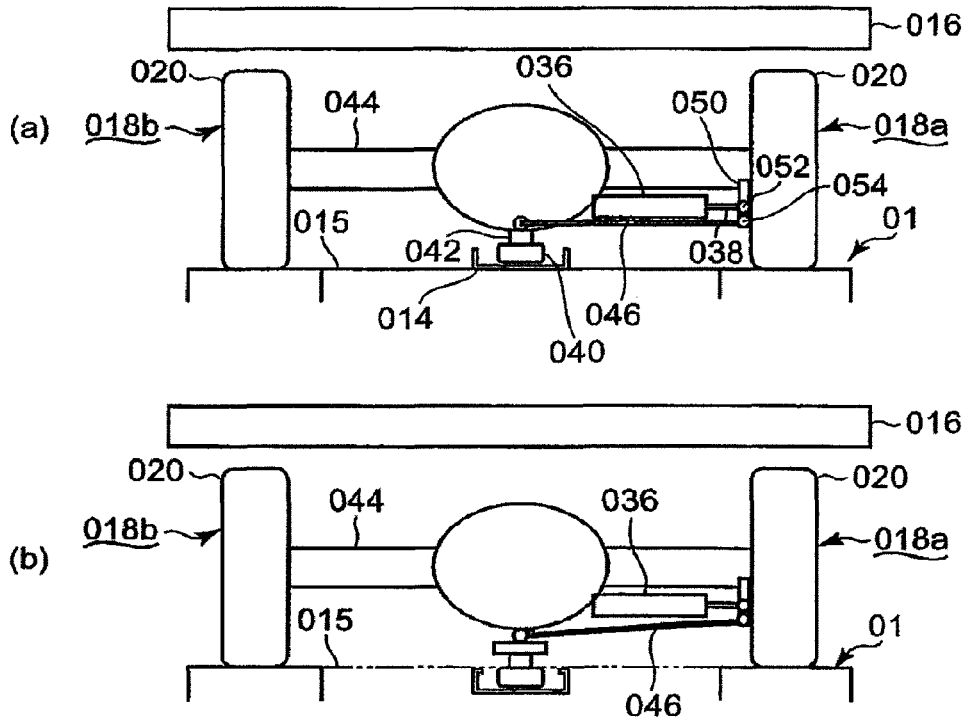
FIG. 25(a) is a sectional view along line S-S in FIG. 24.
FIG. 25(b) is a view illustrating a variant form of a configuration shown in FIG. 25(b)
Figure 26:
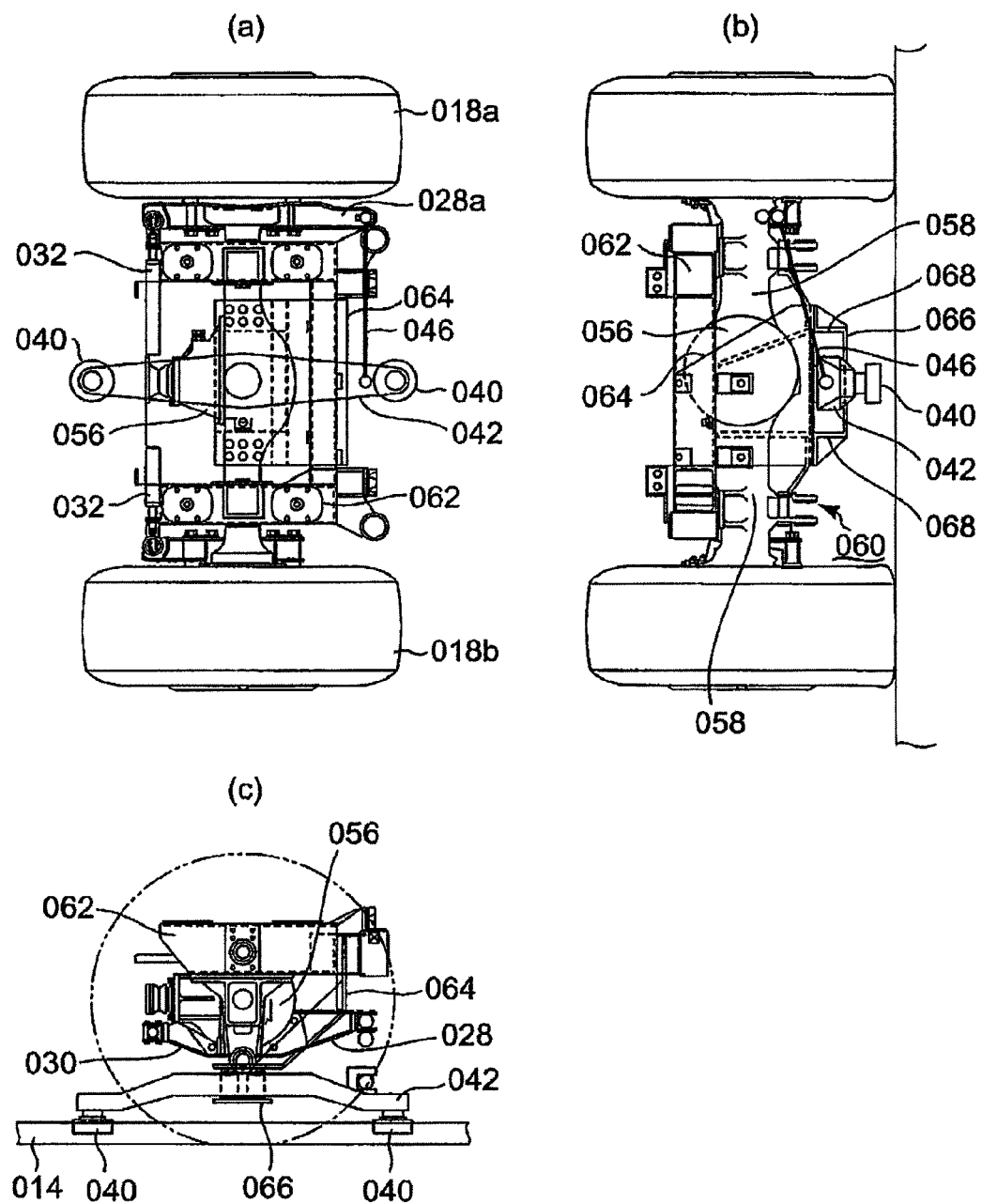
FIG. 26(a) is a plan view illustrating a structure for the attachment of protection wheels in the conventional track type transportation system.
FIG. 26(b) is a front view illustrating the conventional track type transportation system.
FIG. 26(c) is a side view illustrating the conventional track type transportation system.
Figure 27:
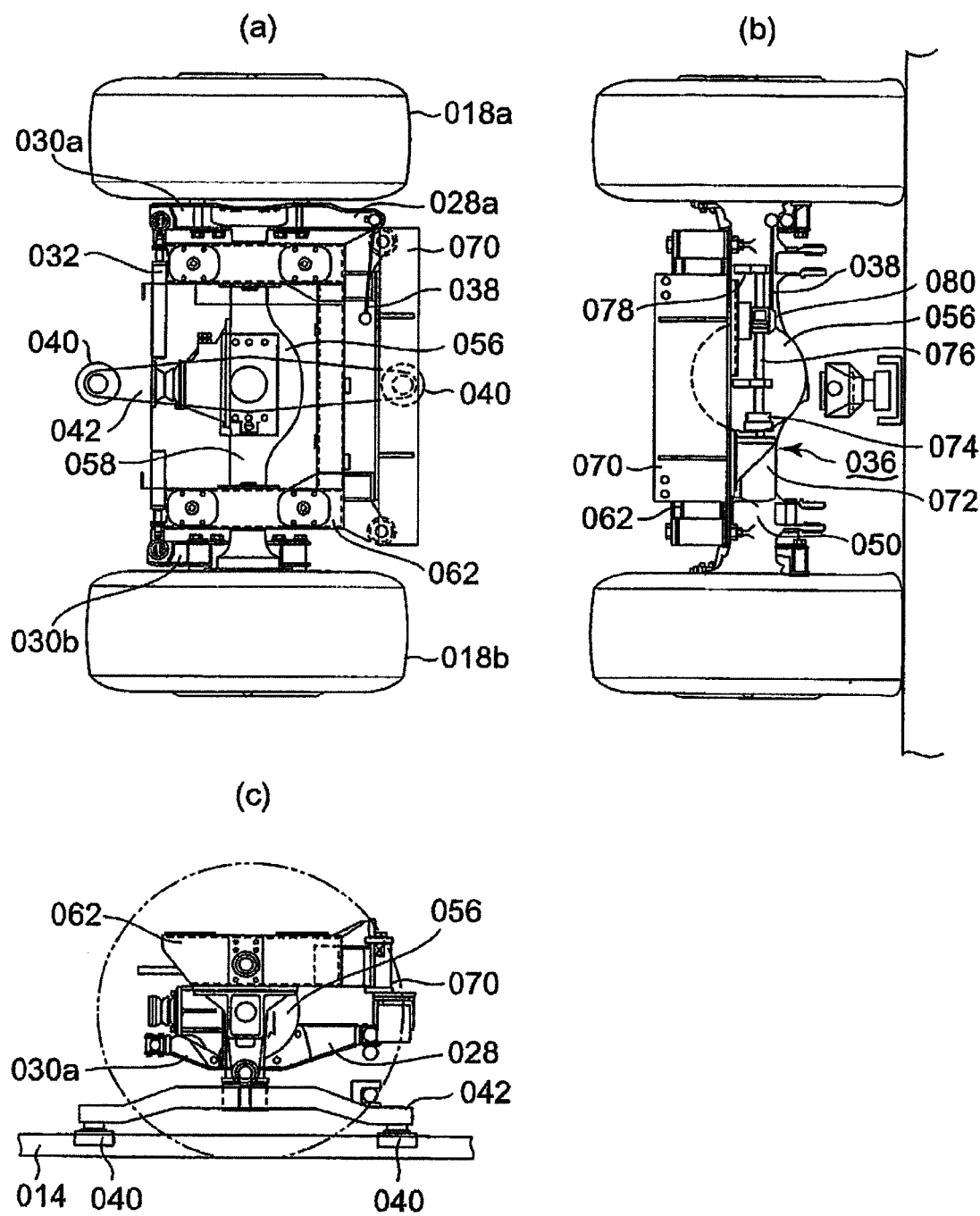
FIG. 27(a) is a plane view illustrating a structure for mounting an actuator in the conventional track type transportation system.
FIG. 27(b) is a front view illustrating the structure shown in FIG. 27(a)
FIG. 27(c) is a rear view illustrating the structure shown in FIG. 27(a).

Next, explanation will be made of a seventh embodiment of the present invention, with reference to FIGS. 20 to 23 in which FIG. 20 is a sectional plan view (along line Q-Q in FIG. 21), FIG. 21 is a sectional elevation view (along line P-P in FIG. 20), FIG. 22 is an elevation view and FIG. 23 is a sectional plan view (along line R-R in FIG. 22). Referring to FIGS. 20 to 23, the configuration using the laser type displacement meters 13, 13 as the noncontact type displacement meters is the same as that of the fourth embodiment, and accordingly, explanation thereto will be omitted. That is, the configuration of this embodiment is the same as that of the fourth embodiment, except a configuration of the noncontact type displacement meter 80 which will be hereinbelow explained.

Referring to FIG. 21, a support post 81 for supporting the roller 32 in the protection track 14 is attached to the lower surface of the protection arm 42 through the intermediary of a joint plate 81a in the vertical direction. Further, a pair of first links 82 are rotatably connected thereto with a pair of second links 84 through the intermediary of fulcrum shafts 85, and the pair of the second links 84 are rotatably connected to a frame 84 through the intermediary of fulcrum shafts 87. The roller 32 is rotatably mounted to the lower part of the frame 86.

A pair of roller extension coil springs 89 are arranged so as to span between the first link 82 and the support column 13 in order to apply a resilient force to a link mechanism 90 composed of the first links 82 and the second links 84, which therefore presses the roller 32 against the side wall 14a o the protection wall 14. A displacement meter 88 is laid between the lower end part of the support post 18 and the fulcrum posts 87. The displacement meter 88 has its cylinder part which is secured to the support post 81 and a piston rod 88a which is connected to the fulcrum shafts 87, for detecting a degree of extension of the piston rod 88a in order to detect a deviated value of the protection wheels 42.

Further, a roller storing motor 91 is arranged in the protection arm 42. The roller storing motor 91 has a rotary shaft 91a which is coupled to one of the fulcrum shaft 83 of the first links 82. Further, the fulcrum shafts 93 are rotated by the roller storing motor 91 so as to move the first link 82 in the direction of the arrow f. Thus, the roller 32 is pulled away from the side wall 14a of the protection track 14 and is stored at the position 32'.

In this embodiment with the above-mentioned configuration, during the running of the vehicle, a deviated value of the protection wheels 42 in the protection track 14 is detected by the laser type displacement sensors 13, 13, similar to the fourth embodiment. During the detection by the sensors 13, 13, the contact type displacement meter 80 is stored at the position 32' as shown in FIGS. 22 and 23 by energizing the roller storing motor 90.

In response to occurrence of malfunctioning of the laser type displacement meters 13, 13, that is, the detection becomes impossible, the controller 69 (refer to FIGS. 3 and 13) energizes the roller storing motor 91 to release the roller 32 from the storage, and as a result, the roller 32 is pressed against the side wall 14a of the protection track 14 by the resilient forces of the roller extending coil springs 89.

More specifically, if the laser type displacement meters are malfunctioning so that the detection becomes impossible, the controller 69 (refer to FIGS. 3 and 13) determines the occurrence of malfunctioning, and changes over into the contact type displacement meter by energizing the roller storing motor in order to release the rollers from their storage, and accordingly, the roller 32 is pressed against the side wall 14a of the protection track 14 by the resilient force of the roller extension coil spring 89.

At this time, a position of the roller 32 widthwise of the protection track can be detected by the displacement meter 88. Thus, it is possible to detect a deviated value of the pivotal center of the protection arm in the protection track 14.

According to this embodiment, normally, a deviated value of the pivotal center of the protection arm can be detected by the noncontact laser type displacement meters 13, 13 with a high degree of fineness and accuracy and a high responsiveness. Further, due to the noncontact type, no wearing problem is caused.

In the case of occurrence of malfunctioning of the laser type displacement meters, a deviated value of the pivotal center of the protection arm can be detected with the use of the contact type displacement sensor 80, thereby it is possible to enhance the reliability of the deviation detecting means.

INDUSTRIAL USABILITY

According to the present invention, in a track type transportation system incorporating an automatic steering mechanism and a fail-safe mechanism, with the provision of the noncontact type displacement meters suspended from the lower part of the vehicle body and located in the protection track, a deviated value of the protection wheels in the protection track can be accurately detected, and the noncontact type displacement meter and the contact type displacement meter are preferably used together, thereby it is possible to provide the reliable detection system.

More specifically, with the provision of the noncontact type displacement meters suspended from the lower part of the vehicle body and located in the protection track, according to the present invention, in a track type transportation system incorporating an automatic steering mechanism and a fail-sage mechanism, a deviated value of the protection wheels in the protection track can be accurately detected, and as well, using preferably the noncontact type displacement meter and the contact type displacement meter together, it is possible to detect a highly reliable detection system can be materialized.

Further, according to the present invention, in a track type transportation system incorporating an automatic steering mechanism and a fail-safe mechanism, a deviated value of the vehicle widthwise of the track can be detected with a high degree of accuracy by the noncontact type displacement meters, and further, since the contact type displacement meters which are additionally provided are made into contact with the protection track only when the noncontact type displacement meters are malfunctioning, thereby it is possible to provide a highly reliable detection mechanism.

The invention claimed is:

1. A track type transportation system in which a vehicle runs on a road surface of a predetermined track, comprising
   a steering mechanism for automatically steering front wheels and rear wheels of the vehicle by means of actuators, and
   a fail-safe mechanism composed of a protection track defined on the road surface of the track, between a pair of left and right side walls extending in parallel with a vehicle running direction, and protection wheels provided to a lower part of the vehicle and running in the protection track defined between the left and right side walls,
   laser displacement meters attached to a bracket suspended downward from the lower part of the vehicle, wherein the laser displacement meters are arranged in a space within the protection track defined between the side walls so as to irradiate a first detection wave from one of the laser displacement meters onto to one of the side walls of the protection track and a second detection wave from the other one of the laser displacement meters onto the other one of the side walls, the laser displacement meters receiving reflection waves from the side walls so as to measure distances from mounted positions of the respective laser displacement meters to the left and right side walls of the protection track, in order to detect left and right deviated values of the vehicle with respect to the protection track,
   a pair of contact members attached to the lower part of the vehicle in the vicinity of the laser displacement meters so as to be movable widthwise of the protection track,
   shifting means for shifting the contact members up to pressing positions at which the contact members are pressed against the left and right side walls of the protection track through the intermediary of a resilient force urging element,
   means for detecting the positions of the contact members making respectively contact with the left and right side walls of the protection track,
   stand-by means for holding the contact members at stand-by positions spaced from the left and right side walls of the protection track, and
   determination means for determining whether the laser displacement meters are malfunctioning or not,
   wherein the contact members are held at the stand-by positions spaced from the left and right side walls of the protection track, by means of the stand-by means, if the laser displacement meters are normally operated, and upon determination of malfunctioning, the contact members are displaced from the stand-by positions to the pressing positions on the associated left and right side walls of the protection track by the shifting means so as to be located at the pressing positions on the left and right side walls of the protection track through the intermediary of the resilient force urging element, thereby to detect left and right deviated values of the vehicle with respect to the protection track through the intermediary of the contact members.

2. The track type transportation system as set forth in claim 1, wherein the shifting means is constituted so as to allow the contact members to move symmetrically, and resilient forces of the resilient force urging element are balanced at the pressing positions on the left and right side walls of the protection track.

3. The track type transportation system as set forth in claim 1, further comprising
   rollers defining the contact members, and
   arms attached at one end part to the lower part of the vehicle in the vicinity of the laser displacement meters so as to be pivotable widthwise of the protection track, the rollers are attached to the other end part of the arms.

4. The track type transportation system as set forth in claim 2, further comprising
   electric motor driven cylinders provided in the lower part of the vehicle in the vicinity of the laser displacement meters and having piston rods which are extendable and retractable widthwise of the protection track, and
   link mechanisms attached to the piston rod of the electric motor driven cylinders and constituting a parallelogram, and
   rollers defining the contact members and attached to the link mechanisms.

5. The track type transportation system as set forth in claim 1, further comprising
   a plurality of slide rods arranged in the lower part of the vehicle in the vicinity of the laser displacement meters, in parallel with each other widthwise of the protection track,
   a slide guide for slidably supporting the slide rods, widthwise of the protection track, and
   rollers defining the contact members and attached to the link mechanisms.

6. The track type transportation system as set forth in claim 2, further comprising
   link mechanisms which are expandable and shrinkable widthwise of the protection track, in the lower part of the vehicle in the vicinity of the laser displacement meters, and
   rollers defining the contact members and attached to the link mechanisms.

\* \* \* \* \*